United States Patent
Kobayashi et al.

(10) Patent No.: US 7,133,080 B2
(45) Date of Patent: Nov. 7, 2006

(54) VIDEO SIGNAL PROCESSOR AND TV RECEIVER USING THE SAME

(75) Inventors: Masaya Kobayashi, Tokyo (JP); Masami Goseki, Tokyo (JP)

(73) Assignee: Sony Corporation (JP)

( * ) Notice: Subject to any disclaimer, the term of this patent is extended or adjusted under 35 U.S.C. 154(b) by 341 days.

(21) Appl. No.: 10/809,516

(22) Filed: Mar. 26, 2004

(65) Prior Publication Data
US 2004/0201781 A1    Oct. 14, 2004

(30) Foreign Application Priority Data
Apr. 9, 2003    (JP) .......................... P2003-105732

(51) Int. Cl.
    H04N 7/18    (2006.01)
(52) U.S. Cl. .................................... 348/663
(58) Field of Classification Search ................ 348/663, 348/664, 669, 725, 571, 577, 453
    See application file for complete search history.

(56) References Cited

U.S. PATENT DOCUMENTS

| | | | | |
|---|---|---|---|---|
| 5,021,870 A | * | 6/1991 | Motoe et al. ................ | 348/451 |
| 5,227,866 A | * | 7/1993 | Sarugaku et al. ........... | 348/441 |
| 5,381,183 A | * | 1/1995 | Ishizuka et al. ............ | 348/458 |
| 5,430,500 A | * | 7/1995 | Hoshino et al. ............ | 348/701 |
| 5,917,554 A | * | 6/1999 | Ohta ........................... | 348/581 |

FOREIGN PATENT DOCUMENTS

| | | |
|---|---|---|
| JP | 09-046726 A | 2/1997 |
| JP | 10-191385 A | 7/1998 |

* cited by examiner

Primary Examiner—Paulos M. Natnael
(74) Attorney, Agent, or Firm—Rader, Fishman & Grauer PLLC; Ronald P. Kananen

(57) ABSTRACT

A video signal processor for improving a detection precision of Y motion and C motion, preventing erroneous judgment, and preventing deterioration of image quality without being influenced by the band of the luminance signal or the phase of a sub-carrier of chroma. The processor includes a provisional 3D Y/C separation motion detection circuit, extracting Y signals of a current frame and a past frame based on composite video signals of three adjacent lines of the current frame and the past frame, detecting Y motion in accordance with a difference of Y signals of the current frame and the past frame by a Y motion detection unit, outputting a Y motion detection signal $MVD_y$, detecting C motion by a C motion detection unit based on Y signals of three adjacent lines in the current frame, outputting a C motion detection signal $MVD_c$, and selecting, according to the motion detection signals $MVD_y$ and $MVD_c$, the difference of the C signals separated from the current frame and the past frame or a predetermined value 0 to generate a C motion coefficient.

8 Claims, 12 Drawing Sheets

VIDEO SIGNAL PROCESSOR AND TV RECEIVER USING THE SAME

BACKGROUND OF THE INVENTION

1. Field of the Invention

The present invention relates to a video signal processor for detecting motion by using a composite video signal, more particularly relates to a video signal processor for detecting motion by analyzing a video signal obtained by a so-called three-dimensionally Y/C separated (luminance signal and color signal separated) video signal and improving the precision of motion detection and a TV receiver using the same.

2. Description of the Related Art

A composite video signal, that is, a composite color video signal, includes a luminance signal, a carrier color signal, and a synchronization signal. A TV receiver separates the luminance signal (Y signal) and the carrier color signal (C signal) from the received composite video signal (hereinafter, referred to as "Y/C separation") to reproduce the color video signal.

Advances in semiconductor integrated circuits have resulted in TV receivers being given built-in line memories for storing video signals in line units and frame memories for storing video signals in frame units. For this reason, the method of performing Y/C separation by comb filters utilizing correlation of luminance signals and carrier color signals between adjacent lines and frames is generally employed.

In the NTSC system of composite video signals, the phases of carrier color signals of composite video signals of adjacent horizontal scan periods are inverse. By utilizing this property, Y/C separation can be realized by a logical operation between video data of the adjacent horizontal scan periods. With this method, however, if there is no correlation between the video signals of adjacent horizontal scan periods, error arises in the result of the Y/C separation, carrier color signal components remain in the separated Y signals, and so-called dot interference occurs, so there is a possibility of deterioration of the image quality. Further, there is also a possibility of the level of the separated carrier color signals being lowered and the reproduced signals ending up deteriorating.

To deal with this problem, the method of monitoring vertical correlation among three adjacent lines and detecting characteristics of pictures of the video signals has been proposed. Among lines having vertical correlation, Y/C separation is carried out by band pass filters in the vertical direction, that is, line comb filters, to reproduce the luminance signals and the color signals. On the other hand, when there is no vertical correlation between the adjacent lines, so-called adaptive two-dimensional comb filters for performing Y/C separation using band pass filters in the horizontal direction in place of the line comb filters to reproduce the luminance signals and the color signals has been proposed. As another method of Y/C separation, use can be also made of so-called motion adaptive three-dimensional comb filters for performing Y/C separation for portions judged to have motion in a field of a video signal by two-dimensional comb filters, extracting a difference signal of the composite video signals in one frame, that is, a C signal, by the frame comb filters for a still portion, and further subtracting the C signal from the composite video signals to thereby generate the Y signals. In the motion adaptive three-dimensional comb filters, it is necessary to correctly detect motion from the composite video signals.

FIG. 12 is a circuit diagram of an example of a video signal processor for detecting motion by using composite video signals of three adjacent lines between two continuous frames. As illustrated, this video signal processor detects motion of the luminance signals (Y motion) and motion of the carrier color signals (C motion) based on video signals CVHc0, CVHc1, and CVHc2 of three adjacent lines in the composite video signals of one current frame and video signals CVHp0, CVHp1, and CVHp2 of three adjacent lines in one past frame and outputs a motion coefficient MVC based on the results of the detection.

As shown in FIG. 12, this video signal processor has comb filters 10 and 20, a Y motion detection circuit 30, and a C motion detection circuit 40. Below, an explanation will be given of these components.

The comb filter 10 receives the video signals CVHc0, CVHc1, and CVHc2 of three adjacent lines in the current frame, performs Y/C separation, and outputs a Y signal $Y_{cur}$ and a color signal $C_{cur}$ of three lines' worth of video signals in the current frame.

The comb filter 20 receives the video signals CVHp0, CVHp1, and CVHp2 of three adjacent lines in one past frame, performs Y/C separation, and outputs a Y signal $Y_{pst}$ and a color signal $C_{pst}$ of these three lines' worth of video signals in the past frame.

The Y motion detection circuit 30 calculates a difference between the Y signals $Y_{cur}$ and $Y_{pst}$ generated by the three-line comb filters 10 and 20 of the current frame and the past frame and outputs the amount of the difference as the amount of motion. Further, the level of a high frequency component (color component) generated by the three-line comb filter is judged by a C level judgment circuit 32. When the result of the judgment is that the level of the C component is large, the amount of difference of the Y signal is output through a low pass filter 33 to a Y motion coefficient generation circuit 34, while when it is that the level of the C component is small, the amount of difference of the Y signal is output as it is to the Y motion coefficient generation circuit 34. This is because, in a picture where there is no correlation of sub carriers in the vertical direction (color sub-carrier waves), for example, color horizontal lines or oblique lines, due to the phase relationship of the chroma (color signals), the sub-carrier components remain in the Y signals of the outputs of the three-line comb filters, and a difference of the Y signals is generated also in a still image. If the difference is judged as an amount of motion as it is, a portion of a still image will be erroneously decided as a moving picture portion. In order to suppress the influence of the sub-carriers, the Y motion detection circuit 30 limits the band of the difference of the Y signals by the low pass filter 33. The Y motion coefficient generation circuit 34 receives the judgment result of a vertical edge judgment circuit 35, converts it to its absolute value, performs coring, eliminates isolated dots, adjusts the gain, and outputs a Y motion coefficient $MVC_y$.

In the C motion detection circuit 40, a chroma correlation detector 41 detects the horizontal correlation of the sub-carriers of chroma or the correlation between lines. An amount of motion is generated in an oblique line in the same way as Y motion detection. Therefore, when both of horizontal correlation of the sub-carriers of chroma and correlation between lines are detected, these differences are calculated using the color signals $C_{cur}$ and $C_{pst}$ of the current frame and the past frame output by the comb filters 10 and 20. On the other hand, when there is no correlation, the color signals $C_{cur}$ and $C_{pst}$ are replaced by 0. Then, a difference calculation circuit 42 calculates the difference of the color signals $C_{cur}$ and $C_{pst}$. The output of the difference calculation circuit 42 is converted to an absolute value, subjected to coring, and adjusted in gain in the C motion coefficient generation circuit 43. The result is output as a C motion coefficient $MVC_c$.

In this way, in the C motion detection circuit 40, by taking the difference of the color signals separated from the composite video signals between frames, in the case of a moving picture having motion, the noncorrelated portion shifts and can be extracted as the amount of motion.

This related art is disclosed in Japanese Unexamined Patent Publication (Kokai) No. 9-46726 and Japanese Unexamined Patent Publication (Kokai) No. 10-191385.

Summarizing the problems to be solved by the invention, in the above video signal processor of the related art, in the high frequency band of colored luminance signals, the sensitivity of the Y motion detection becomes low. As a result, an afterimage of the Y high frequency band appears. Since the C motion detection takes the difference of the absolute values of the sub-carriers, in a portion where the phase of the color is shifted by 180°, the amount of motion of the color is detected as 0 and it is erroneously judged as a still portion without motion. As a result, there is the disadvantage that the motion of only color having no luminance difference cannot be detected, the afterimage of the color or the sub-carrier of chroma leaks into the Y signals by the three-dimensional Y/C separation due to the erroneous judgment of the motion detection, and so-called dot interference of the display of a dot image occurs.

In the above conventional motion detection, provisional Y/C separation is carried out by the output of the three-line comb filter. The difference among these frames is defined as the amount of motion, so it is easily judged that a still image of a horizontal line or oblique line in which the correlation of chroma is lost among lines has motion. In order to avoid this, when it is judged that there is color, this is passed through the low pass filter. As a result, however, the sensitivity of the motion detection is lowered in the high frequency band of the Y signals. Conversely, when trying to detect up to the high frequency band of the Y signals, it is judged that there is motion in the high frequency band of an oblique line, so there is a problem that the portion of a still image flickers.

Further, as explained above, by taking the difference of absolute values of the sub-carriers by the C motion detection, motion of color having a phase of the carrier color signal shifted by 180° is no longer detected. As a result, it becomes impossible to detect motion of only color having no luminance difference, and dot interference occurs due to the erroneous judgment of the motion detection.

Furthermore, in the conventional motion detection, since the calculation of the amount of motion is replaced by 0 according to the presence of the correlation of chroma, in the C motion detection of a still image of an image pattern in which the Y signal has correlation like chroma at an oblique line near the colored sub-carrier frequency $f_{sc}$, one frame has correlation, and the other frame does not have correlation, so erroneous judgment that the still image has motion is carried out. As a result, an oblique line of the still image is separated by the line comb filter, and deterioration of the band of the Y signal occurs.

SUMMARY OF THE INVENTION

An object of the present invention is to provide a video signal processor having a motion detection function able to improve a precision of detection of Y motion and C motion, able to prevent erroneous judgment, and able to prevent the deterioration of the image quality by this without relying on the band of the luminance signal and without influence of the phase of the sub-carrier of chroma and a TV receiver using the same.

To attain the above object, according to a first aspect of the present invention, there is provided a video signal processor comprising a first motion detection unit for finding a difference between a luminance signal included in a predetermined composite video signal in a current frame and a luminance signal included in a composite video signal in a past frame having a predetermined time interval and outputting a first motion detection signal in accordance with the difference; a second motion detection unit for extracting luminance signals included in a plurality of composite video signals in the current frame based on a plurality of composite video signals having a predetermined interval in a vertical direction in the current frame and a plurality of predetermined composite video signals in the vertical direction at the same position in the past frame, detecting the correlation of color signal components remaining in the extracted video signals, and outputting a second motion detection signal in accordance with the result of the detection; a color signal difference calculating means for calculating a difference of absolute values of color signals in the current frame calculated based on the three composite video signals in the current frame and color signals in the past frame calculated based on the composite video signals of the past frame; a selecting means for selecting the difference of the color signals calculated by the color signal difference calculating means when either of the first motion detection signal or the second motion detection signal indicates that there is motion and selecting an intended value indicating that there is no motion when both of the first motion detection signal and the second motion detection signal indicate that there is no motion; and a motion coefficient generating means for outputting a motion coefficient indicating motion in accordance with the value selected by the selecting means.

Further, according to a second aspect of the present invention, there is provided a video signal processor comprising a first motion detection unit for finding a difference between a luminance signal included in a predetermined composite video signal in a current frame and a luminance signal included in a composite video signal in a past frame having a predetermined time interval and outputting a first motion detection signal in accordance with the difference; a second motion detection unit for extracting luminance signals included in three composite video signals in the current frame based on three composite video signals having a predetermined interval in a vertical direction in the current frame and three predetermined composite video signals in the vertical direction at the same position in the past frame, detecting the correlation of color signal components remaining in the extracted video signals, and outputting a second motion detection signal in accordance with the result of the detection; a color signal difference calculating means for calculating a difference of absolute values of color signals in the current frame calculated based on the three composite video signals in the current frame and color signals in the past frame calculated based on the composite video signals of the past frame; a first selecting means for selecting the difference of the color signals calculated by the color signal difference calculating means when the first motion detection signal indicates that there is motion and selecting an intended first value indicating that there is no motion when the first motion detection signal indicates that there is no motion; a second selecting means for selecting an intended second value indicating that there is motion when the second motion detection signal indicates that there is motion and selecting the output signal of the first selecting means when the second motion detection signal indicates that there is no motion; and a motion coefficient generating means for outputting the motion coefficient indicating motion in accordance with the value selected by the second selecting means.

Further, according to a third aspect of the present invention, there is provided a TV receiver for judging motion of an image in accordance with a motion coefficient generated based on a composite video signal, separating a luminance signal and a color signal from the composite video signal by using a frame comb filter for a still image having no motion, separating a luminance signal and a color signal from the composite video signal by using a band pass filter or a two-dimensional comb filter for a moving picture having motion and reproducing a video signal, comprising a first motion detection unit for finding a difference between a luminance signal included in a predetermined composite video signal in a current frame and a luminance signal included in a composite video signal in a past frame having a predetermined time interval and outputting a first motion detection signal in accordance with the difference; a second motion detection unit for extracting luminance signals included in three composite video signals in the current frame based on three composite video signals having a predetermined interval in a vertical direction in the current frame and three predetermined composite video signals in the vertical direction at the same position in the past frame, detecting the correlation of color signal components remaining in the extracted video signals, and outputting a second motion detection signal in accordance with the result of the detection; a color signal difference calculating means for calculating a difference of absolute values of color signals in the current frame calculated based on the three composite video signals in the current frame and color signals in the past frame calculated based on the composite video signals of the past frame; a selecting means for selecting the difference of the color signals calculated by the color signal difference calculating means when either of the first motion detection signal or the second motion detection signal indicates that there is motion and selecting an intended value indicating that there is no motion when both of the first motion detection signal and the second motion detection signal indicate that there is no motion; and a motion coefficient generating means for outputting a motion coefficient indicating motion in accordance with the value selected by the selecting means.

Further, according to the fourth aspect of the present invention, there is provided a TV receiver for judging motion of an image in accordance with a motion coefficient generated based on a composite video signal, separating a luminance signal and a color signal from the composite video signal by using a frame comb filter for a still image having no motion, separating a luminance signal and a color signal from the composite video signal by using a band pass filter or a two-dimension comb filter for a moving picture having motion and reproducing the video signal, comprising a first motion detection unit for finding a difference between a luminance signal included in a predetermined composite video signal in a current frame and a luminance signal included in a composite video signal in a past frame having a predetermined time interval and outputting a first motion detection signal in accordance with the difference; a second motion detection unit for extracting luminance signals included in a plurality of composite video signals in the current frame based on a plurality of composite video signals having a predetermined interval in a vertical direction in the current frame and a plurality of predetermined composite video signals in the vertical direction at the same position in the past frame, detecting the correlation of color signal components remaining in the extracted video signals, and outputting a second motion detection signal in accordance with the result of the detection; a color signal difference calculating means for calculating a difference of absolute values of color signals in the current frame calculated based on the three composite video signals in the current frame and color signals in the past frame calculated based on the composite video signals of the past frame; a first selecting means for selecting the difference of the color signals calculated by the color signal difference calculating means when the first motion detection signal indicates that there is motion and selecting an intended first value indicating that there is no motion when the first motion detection signal indicates that there is no motion; a second selecting means for selecting an intended second value indicating that there is motion when the second motion detection signal indicates that there is motion and selecting the output signal of the first selecting means when the second motion detection signal indicates that there is no motion; and a motion coefficient generating means for outputting a motion coefficient indicating motion in accordance with the value selected by the second selecting means.

Preferably, the second motion detection unit has a first horizontal correlation detection unit for outputting a first horizontal correlation detection signal in accordance with a difference between the extracted luminance signal and a delay signal obtained by delaying the luminance signal by exactly one period's worth of the color sub-carrier wave, a second horizontal correlation detection unit for outputting a second horizontal correlation detection signal in accordance with an amplitude of the signal obtained by passing the extracted luminance signal through a band pass filter using the frequency of the color sub-carrier wave as the center frequency, and a logical circuit for generating a horizontal correlation detection signal indicating the horizontal correlation of color signals in accordance with a logical AND of the first and second horizontal correlation detection signals.

Preferably, the second motion detection unit has a first vertical correlation detection unit for outputting a first vertical correlation detection signal in accordance with a difference between first and third luminance signals extracted from the composite video signals in which corresponding color signals have the same phase in accordance with first, second, and third luminance signals extracted from three composite video signals in the vertical direction in the current frame, a second vertical correlation detection unit for outputting a second vertical correlation detection signal in accordance with a difference between signals obtained from the first and the second luminance signals corresponding to the composite video signals in which corresponding color signals have inverse phases passed through the band pass filter using the frequency of the color sub-carrier wave as the center frequency, a third vertical correlation detection unit for outputting a third vertical correlation detection signal in accordance with a difference of signals obtained from the second and third luminance signals corresponding to the composite video signals in which corresponding color signals have inverse phases passed through the band pass filter using the frequency of the color sub-carrier wave as the center frequency, a logical circuit for generating a vertical correlation detection signal indicating vertical correlation of the color signals in accordance with the logical AND of the first, second, and third vertical correlation detection signals, and a logical operation circuit for outputting the second motion detection signal in accordance with the logical AND of the horizontal correlation detection signal and the vertical correlation detection signal.

According to the present invention, the first motion detection signal, that is, the Y motion detection signal is obtained in accordance with the luminance signal included in the predetermined composite video signal in the past frame having a predetermined time interval from the predetermined composite video signal in the current frame. Then, based on three composite video signals having the predetermined interval in the current frame and three composite video signals at the same positions of the past frame, three luminance signals corresponding to the three composite video signals in the current frame are extracted, and the second motion detection signal, that is, the C motion detection signal, is obtained by utilizing the correlation of the color signal components remaining in the extracted three luminance signals. Then, based on the first and second motion detection signals, the difference of the color signals extracted in the current frame and the past frame or an intended constant indicating the amount of motion is selected, and the motion coefficient indicating the motion of the image is generated based on the selected value.

In a TV receiver according to the present invention, a moving picture portion and a still image portion in the image are judged based on the motion coefficient, and the luminance signal and the color signal are separated by using different Y/C separation methods in the portions, so the precision of the Y/C separation is improved and an enhancement of the image quality is achieved.

BRIEF DESCRIPTION OF THE DRAWINGS

These and other objects and features of the present invention will be more apparent from the following description of the preferred embodiments given with reference to the accompanying drawings, wherein.

DESCRIPTION OF THE PREFERRED EMBODIMENTS

First Embodiment

Figure 1:
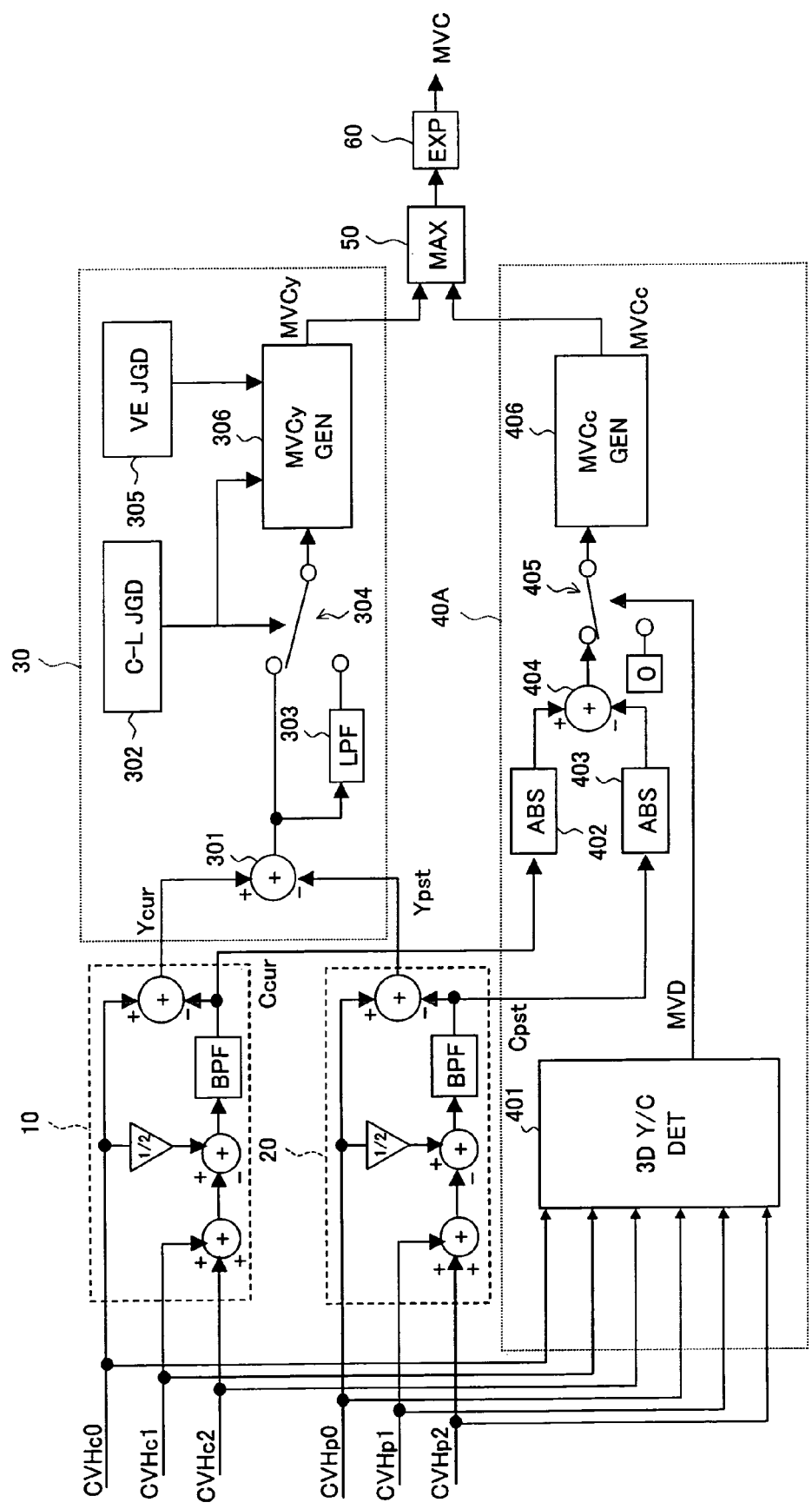
FIG. 1 is a view of the configuration of a video signal processor according to a first embodiment of the present invention.

FIG. 1 is a circuit diagram of a video signal processor according to a first embodiment of the present invention. As illustrated, the video signal processor of the present embodiment has comb filters 10 and 20, a Y motion detection circuit 30, a C motion detection circuit 40A, a maximum value circuit (MAX) 50, and an expansion circuit 60.

Below, an explanation will be given of components of the video signal processor of the present embodiment by referring to FIG. 1.

The comb filters 10 and 20 perform two-dimensional Y/C separation for the composite video signals of the current frame and the past frame and output the Y signal and the C signal. The comb filter 10 receives video signals CVHc0, CVHc1, and CVHc2 of three adjacent-lines in the current frame, performs the two-dimensional Y/C separation, and outputs the Y signals $Y_{cur}$ and the color signals $C_{cur}$ in these three lines' worth of video signals in the current frame. The comb filter 20 receives the video signals CVHp0, CVHp1, and CVHp2 of three adjacent lines in one past frame, performs the two-dimensional Y/C separation, and outputs the Y signal $Y_{pst}$ and the color signal $C_{pst}$ of these three lines' worth of video signals in the past frame.

The video signals CVHc0, CVHc1, and CVHc2 of three adjacent lines are output by for example a not illustrated line memory. The line memory stores the video data corresponding to one horizontal synchronization of the composite video signals. By connecting two stages of line memories in series, three adjacent lines' worth of the video signals are obtained. Further, the three adjacent lines' worth of the video signals of the past frame are output by a not illustrated frame memory. The frame memory stores one frame's worth of the video data of the composite video signal.

Note that the line memory and the frame memory are applied to the NTSC system of composite video signals, but for example, in the case of the PAL system of composite video signals, the line memory stores two lines' worth of the video data, and the frame memory stores two frames' worth of the video data. This is because, in the case of the NTSC system of composite video signals, the phases of the color sub-carrier waves (sub-carriers) between video signals of adjacent lines or adjacent frames are shifted by 180°, while in the case of the PAL system of video signals, the phases of the sub-carriers between video signals separated by two lines or two frames are shifted by 180°. Note that the sampling rate for quantifying the composite video signal is four times the usual sub-carrier frequency $f_{sc}$, that is, $4f_{sc}$.

The Y motion detection circuit 30 is configured by, as shown in FIG. 1, an adder circuit 301, a C level judgment circuit 302, a low pass filter 303, a switch (selection circuit) 304, a vertical edge judgment circuit 305, and a Y motion coefficient generation circuit 306. In the Y motion detection circuit 30, the adder circuit 301 calculates the difference between the Y signals $Y_{cur}$ and $Y_{pst}$ generated by the three-line comb filters 10 and 20 of the current frame and the past frame and outputs the amount of the difference to the low pass filter 303 and the selection circuit 304.

The C level judgment circuit 302 judges the level of the high frequency component of the C signal generated by the three-line comb filter and controls the selection circuit 304 in accordance with the result of the judgment. The selection circuit 304 outputs the amount of difference of the Y signals through the low pass filter 303 to the Y motion coefficient generation circuit 306 when the level of the high frequency component of the C component is large, and outputs the amount of difference of the Y signals to the Y motion coefficient generation circuit 306 as it is when the level of the C component is small. This is because, in a picture in which there is no correlation of the sub-carriers in the vertical direction (color sub-carrier waves) such as colored horizontal lines or oblique lines, due to the phase relationship of the color signals, the sub-carrier components remain in the Y signals at the outputs of the three-line comb filters. In a still image, a difference of the Y signals is generated. When the difference is defined as the amount of motion as it is, the portion of the still image is erroneously decided as a moving picture portion. In order to suppress the influence of the sub-carriers, in the Y motion detection circuit 30, the band of the difference of the Y signals is limited by the low pass filter 303.

The vertical edge judgment circuit 305 judges whether or not there is an edge in the vertical direction of the video signal and controls the operation of the Y motion coefficient generation circuit 306 in accordance with the result of judgment. The Y motion coefficient generation circuit 306 receives the result of judgment of the vertical edge judgment circuit 305, converts it to an absolute value, performs coring, eliminates isolated dots, and adjusts the gain and outputs the Y motion coefficient $MVC_y$. The Y motion coefficient generation circuit 306 calculates the absolute value of the amount of motion input from the selection circuit 304, compares the absolute value of the amount of motion and a reference value having an appropriate magnitude, and, when the absolute value of the amount of motion is smaller than the reference value, performs coring replacing the amount of motion by 0. By the coring, a noise component having a small amplitude is eliminated. Further, by the isolated dot elimination processing, continuity between frames is detected, and erroneous judgment is prevented for a still image. Further, the Y motion coefficient generation circuit 306 adjusts the motion detection sensitivity by multiplying a suitable coefficient with the absolute value of the difference between frames by using the gain adjustment circuit and generates and outputs the Y motion coefficient $MVC_y$ having an intended magnitude.

Next, an explanation will be given of the C motion detection circuit 40A. As shown in FIG. 1, the C motion detection circuit 40A has a provisional three-dimensional (provisional 3D) Y/C separation motion detection circuit 401, absolute value circuits 402 and 403, a subtractor circuit 404, a selection circuit 405, and a C motion coefficient generation circuit 406.

The provisional 3D Y/C separation motion detection circuit 401 performs the three-dimensional Y/C separation and detects motion. Note that details of the provisional 3D Y/C separation motion detection circuit 401 will be explained later.

The absolute value circuits 402 and 403 find the absolute values of the color signal $C_{cur}$ of the current frame and the color signal $C_{pst}$ of the past frame output from the comb filters 10 and 20 and outputs the same to the subtractor circuit 404. The subtractor circuit 404 calculates the difference between the absolute values of the color signal $C_{cur}$ of the current frame output from the absolute value circuit 402 and the color signal $C_{pst}$ of the past frame output from the absolute value circuit 403 and outputs the same to the selection circuit 405.

The selection circuit 405 selects either of the output of the subtractor circuit 404 or a predetermined value, for example 0, in accordance with the detection result of the provisional 3D Y/C separation motion detection circuit 401 and outputs the same as the amount of motion to the C motion coefficient generation circuit 406. Concretely, the selection circuit 405 selects the output of the subtractor circuit 404, that is, the difference of C signals between the current frame and the past frame, when motion is indicated as the result of the detection of the provisional 3D Y/C separation motion detection circuit 401 and outputs the same to the C motion coefficient generation circuit 406. On the other hand, when the result of the detection of the provisional 3D Y/C separation motion detection circuit 401 is that there is no motion, the selection circuit 405 selects a predetermined value, for example 0, and outputs the same to the motion coefficient generation circuit 406.

The motion coefficient generation circuit 406 generates the motion coefficient $MVC_c$ in accordance with the amount of motion input from the selection circuit 405. Note that the motion coefficient generation circuit 406 converts the output to an absolute value, performs coring, and adjusts the gain. The absolute value processing is for calculating the absolute value of the amount of motion input from the selection circuit 405. Then, the coring compares the absolute value of the amount of motion and a predetermined reference value. When the absolute value of the amount of motion is smaller than the reference value, the amount of motion is replaced by 0. By the coring, a noise component having a small amplitude is eliminated. Further, in the gain adjustment, the motion detection sensitivity is adjusted by multiplying a suitable coefficient with the absolute value of the amount of motion input from the selection circuit 405, that is, the absolute value of the difference of the inter-frame C signals. The C motion coefficient $MVC_c$ having an intended magnitude is therefore generated and output.

The maximum value circuit 50 selects the largest value among the C motion coefficient $MVC_y$ output by the Y motion detection circuit 30 and the C motion coefficient $MVC_c$ output by the C motion detection circuit 40A and outputs the same.

The expansion circuit 60 expands the maximum value output by the maximum value circuit 60, eliminates noise having discontinuity, and outputs the motion coefficient MVC.

Next, an explanation will be given of the configuration and the operation of the provisional 3D Y/C separation motion detection circuit 401 in the C motion detection circuit 40A.

Figure 2:
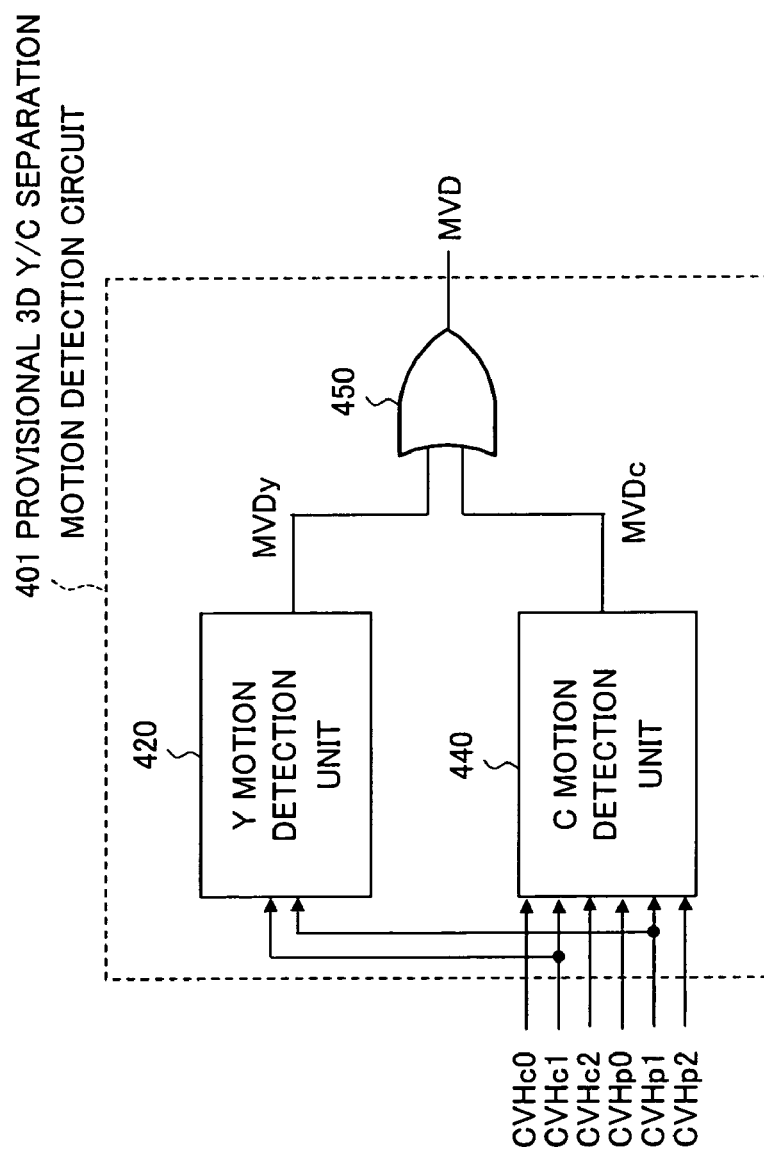
FIG. 2 is a block diagram of the configuration of a provisional 3D Y/C separation motion detection circuit.

FIG. 2 is a block diagram of the configuration of a provisional 3D Y/C separation motion detection circuit. As shown in FIG. 2, the provisional 3D Y/C separation motion detection circuit 401 has a Y motion detection unit 420, a C motion detection unit 440, and a logical OR operation circuit 450.

The Y motion detection unit 420 detects motion based on the luminance signal (Y signal) included in the composite video signal and outputs the Y motion detection signal $MVD_y$. The C motion detection unit 440 detects motion based on the color signal (C signal) included in the composite video signal and outputs the C motion detection signal $MVD_c$. Then, based on these motion detection signals, the motion detection signal, MVD is output. Namely, when motion is detected by either of the Y motion detection unit 420 or the C motion detection unit 440, the judgment result that there is motion is output.

Figure 3:
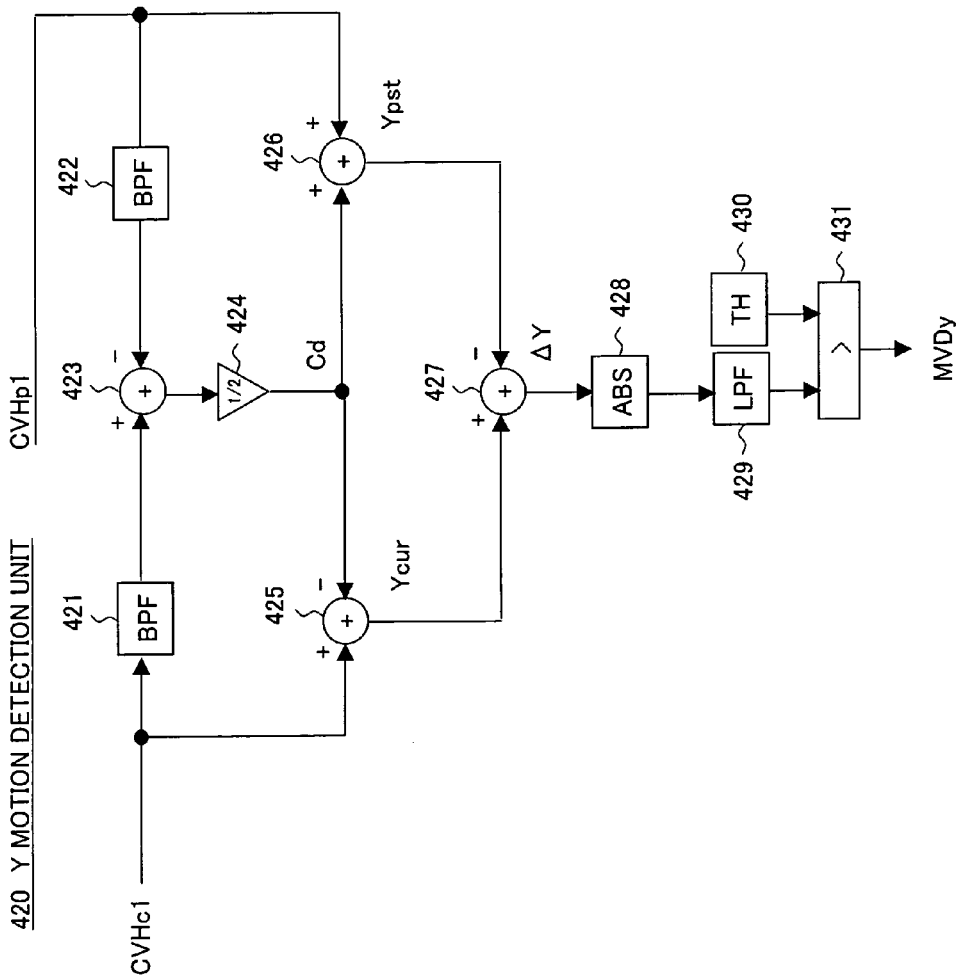
FIG. 3 is a circuit diagram of the configuration of a Y motion detection unit.
Figure 4:
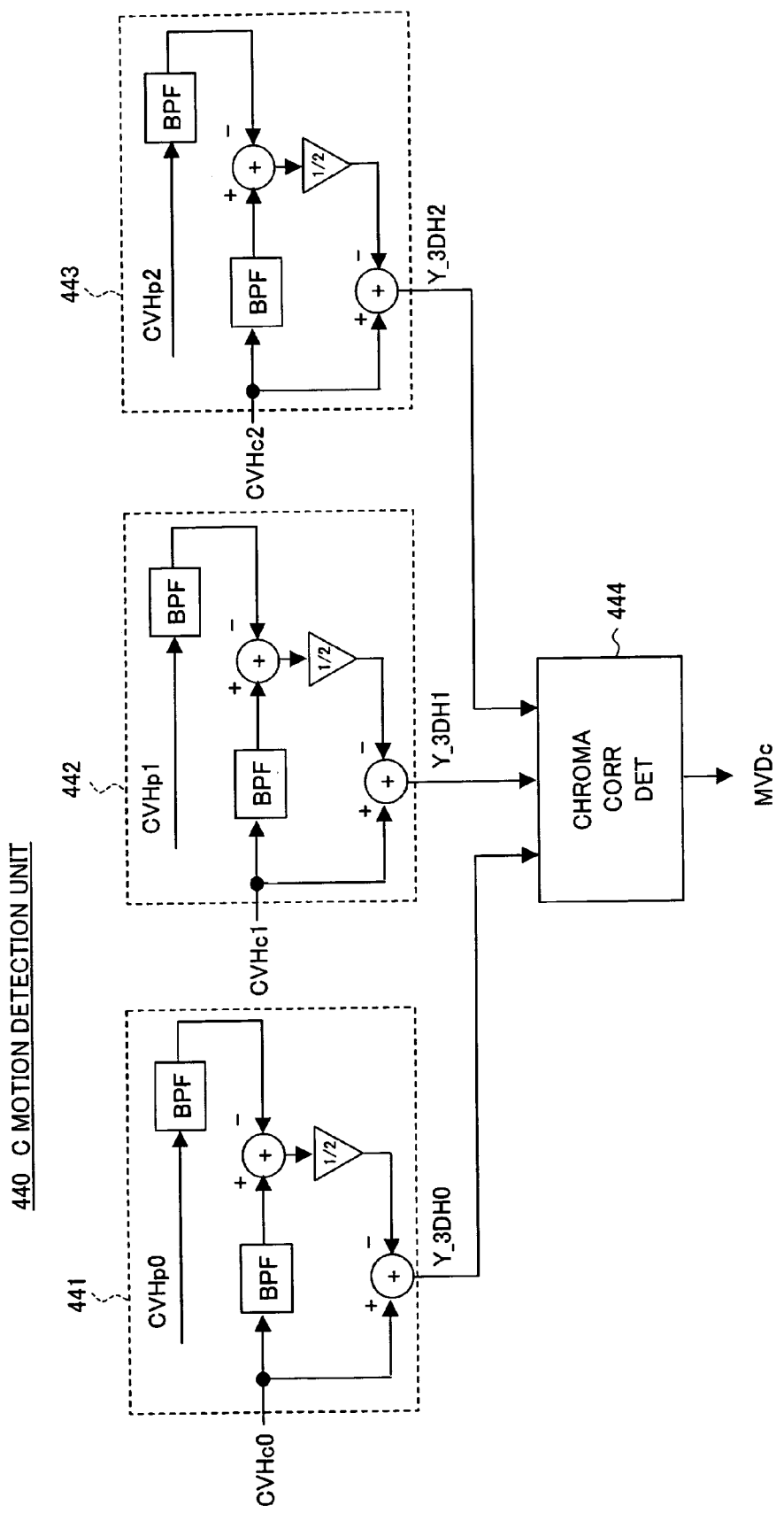
FIG. 4 is a circuit diagram of the configuration of a C motion detection unit.

FIG. 3 is a circuit diagram of the configuration of the Y motion detection unit 420; and FIG. 4 is a circuit diagram of the configuration of the C motion detection unit 440. Below, an explanation will be given of the Y motion detection unit 420 and the C motion detection unit 440 by referring to FIG. 3 and FIG. 4.

First, the configuration of the Y motion detection unit 420 will be explained by referring to FIG. 3. The Y motion detection unit 420 judges the motion based on the Y signals of the composite video signals of the current frame and the past frame. As mentioned above, in the NTSC system of composite video signals, the phases of the color signals of the composite video signals between adjacent frames are shifted by 180°, so the Y motion detection unit 420 detects the Y motion by utilizing this characteristic. Note that, in the case of the PAL system of composite video signals, the phases of the color signals of the composite video signals of every other line or every other frame are shifted by 180°. Therefore, the CVHp1 becomes the composite video signal two frames before the current frame.

The Y motion detection unit 420 has, as shown in FIG. 3, band pass filters (BPF) 421 and 422, subtractor circuits 423, 425, and 427, an adder circuit 426, an amplifier circuit 424, an absolute value circuit 428, a low pass filter 429, a threshold value generation circuit 430, and a comparison circuit 431.

The center frequency of the band pass filters 421 and 422 is the frequency $f_{sc}$ of the sub-carrier, that is, the color sub-carrier wave. The band pass filter 421 passes only the color signal component included in the composite video signal CVHc1 of the current frame, and the band pass filter 422 passes only the color signal component included in the composite video signal CVHp1 of the past frame.

The subtractor circuit 423 finds the difference of outputs between the band pass filters 421 and 422. In the case of a still image, the luminance signal components of the composite video signal CVHc1 of the current frame and the composite video signal CVHp1 of the past frame are equal, and the phases of the color signal components are shifted by 180°, so the Y signal component is cancelled by the subtraction of the subtractor circuit 423 and the C signal component is output doubled in amplitude.

The amplifier circuit 424 adjusts the amplitude of the output signal of the subtractor circuit 423, that is, the C component having the double amplitude, for example to halve the amplitude and outputs a signal $C_d$ having almost the same level as the C component included in the original composite video signal.

The subtractor circuit 425 outputs the difference between the composite video signal of the current frame and the C component having the amplitude adjusted by the amplifier circuit 424. The adder circuit 426 outputs a sum of the composite video signal of the past frame and the C component having the amplitude adjusted by the amplifier circuit 424.

For this reason, as a result of the calculation of the difference between the composite video signal CVHc1 of the current frame and the C component signal $C_d$ by the subtractor circuit 425, the Y signal $Y_{cur}$ included in the composite video signal of the current frame is output. On the other hand, the adder circuit 426 calculates the sum of the composite video signal CVHp1 of the past frame and the C component signal $C_d$ and outputs the Y signal $Y_{pst}$ included in the composite video signal of the past frame as a result.

The subtractor circuit 427 finds the difference of the operation results of the subtractor circuit 425 and the adder circuit 426. Namely, the subtractor circuit 427 calculates the difference signal $\Delta Y$ between the Y signal $Y_{cur}$ of the current frame and the Y signal $Y_{pst}$ of the past frame (hereinafter, described as the luminance difference signal $\Delta Y$).

The absolute value circuit 428 calculates the absolute value of the luminance difference signals $\Delta Y$. The low pass filter 429 smooths the high frequency component of the absolute value of the luminance difference signal $\Delta Y$ calculated by the absolute value circuit 428.

The comparison circuit 431 compares the output signal of the low pass filter 429 and the predetermined threshold value output from the threshold value generation circuit 430 and uses the result of the comparison for the motion judgment. Namely, in the comparison circuit 431, when the level of the luminance difference signal $\Delta Y$ output from the low pass filter 429 is larger than the threshold value, it is seen that the difference between the Y signal in the composite video signal of the current frame and the Y signal in the composite video signal of the past frame is larger than a predetermined reference value. For this reason, it can be judged that there is motion. On the other hand, when the level of the luminance difference signal $\Delta Y$ is smaller than the threshold value, it is seen that the difference between the Y signal in the composite video signal of the current frame and the Y signal in the composite video signal of the past frame is smaller than the predetermined reference value. For this reason, it can be judged that there is no motion, that is, the image is a still image.

As explained above, the Y motion detection unit 420 shown in FIG. 3 finds the luminance difference signal $\Delta Y$ of luminance signals between the composite video signal of the current frame and the composite video signal of the past frame. When the amplitude of the luminance difference signal $\Delta Y$ is more than a predetermined reference value, it judges that there is motion, while when the amplitude of the luminance difference signal $\Delta Y$ is less than the predetermined reference value, it judges the image to be a still image having no motion.

In the processing performed in the Y motion detection unit 420, the difference is calculated in the entire band of the Y signals included in the composite video signals. Therefore, the high frequency components of the Y signals can be detected. Further, upper and lower lines in the same frame are not used, so there is no influence due to the correlation between the upper and lower lines. For this reason, in an oblique line mainly comprised of the frequency component near the sub-carrier $f_{sc}$ which is easily judged as motion in conventional motion detection, this is judged as still based on the result of the Y motion detection unit 420 mentioned above, so erroneous judgment in the motion detection can be prevented.

Next, an explanation will be given of the C motion detection unit 440 by referring to FIG. 4. As shown in FIG. 4, the C motion detection unit 440 has frame comb filters 441, 442, and 443 and a chroma correlation detection circuit 444. Below, an explanation will be given of these components.

The frame comb filters 441, 442, and 443 find Y signals Y_3DH0, Y_3DH1, and Y_3DH2 included in the composite video signals of the current frame in accordance with the composite video signals CVHc0, CVHc1, and CVHc2 of the current frame and one past frame composite video signals CVHp0, CVHp1, and CVHp2.

For example, the frame comb filter 441 first finds the difference of the signals obtained by passing these composite video signals through the band pass filter in accordance with the composite video signal CVHc0 of the current frame and the composite video signal CVHp0 of the past frame to output the signal of the C component. Then, by subtracting the signal of the C component from the composite video signal CVHc0 of the current frame, the Y signal Y_3DH0 of the current frame is obtained.

In the same way as above, the frame comb filters 442 and 443 acquire the Y signals Y_3DH1 and Y_3DH2 of the current frame. The Y signals Y_3DH0, Y_3DH1, and Y_3DH2 of the current frame found by the frame comb filters 441, 442, and 443 are supplied to the chroma correlation detection circuit 444.

The chroma correlation detection circuit 444 detects C motion in accordance with the Y signals Y_3DH0, Y_3DH1, and Y_3DH2 of the current frame found by the frame comb filters 441, 442, and 443.

Figure 5:
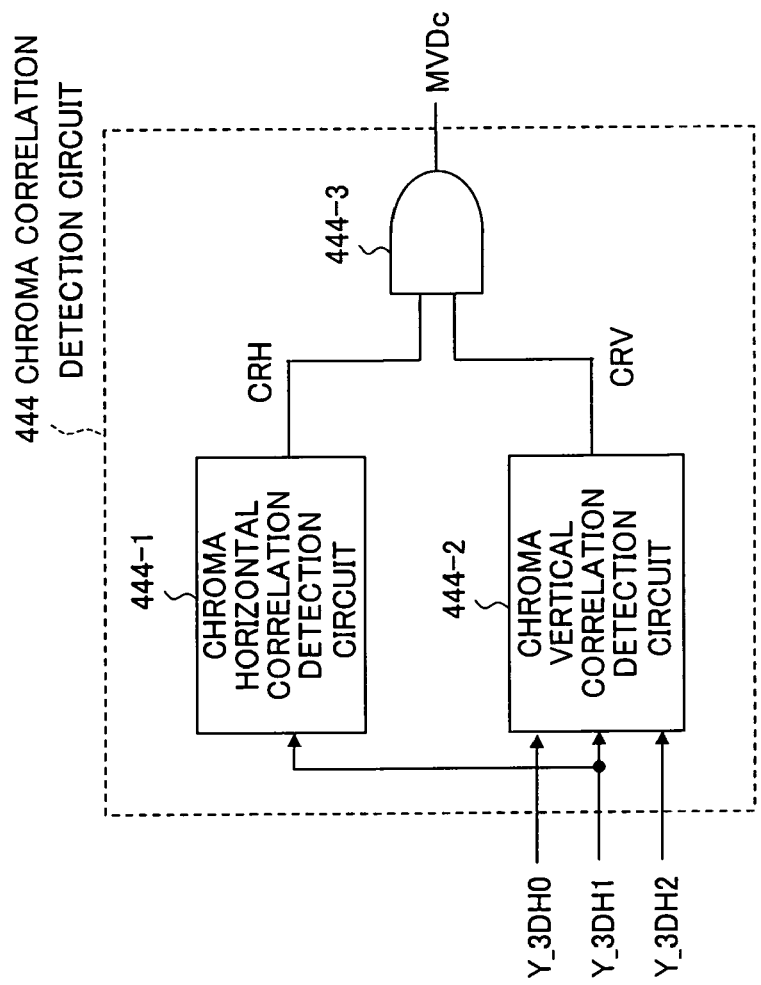
FIG. 5 is a block diagram of the configuration of a chroma correlation detection circuit.

The chroma correlation detection circuit 444 has a chroma horizontal correlation detection unit 444-1 and a chroma vertical correlation detection unit 444-2. FIG. 5 is a block diagram of the configuration of the chroma correlation detection circuit 444. As illustrated, the chroma correlation detection circuit 444 has a chroma horizontal correlation detection unit 444-1, a chroma vertical correlation detection unit 444-2, and a logical AND operation circuit 444-3.

In the chroma correlation detection circuit 444, the chroma horizontal correlation detection unit 444-1 outputs the chroma horizontal correlation detection signal CRH, and the chroma vertical correlation detection unit 444-2 outputs the chroma vertical correlation detection signal CRV. In accordance with the logical AND of these correlation detection signals, the chroma correlation detection signal (C correlation detection signal) $MVD_c$ is output. Namely, when chroma correlation is detected in both of the chroma horizontal correlation detection unit 444-1 and the chroma vertical correlation detection unit 444-2, the judgment that there is chroma correlation is output.

Below, an explanation will be given of the configuration and the operation of the chroma horizontal correlation detection unit 444-1 and the chroma vertical correlation detection unit 444-2. First, an explanation will be given of the chroma horizontal correlation detection unit 444-1 by referring to FIG. 6.

Figure 6:
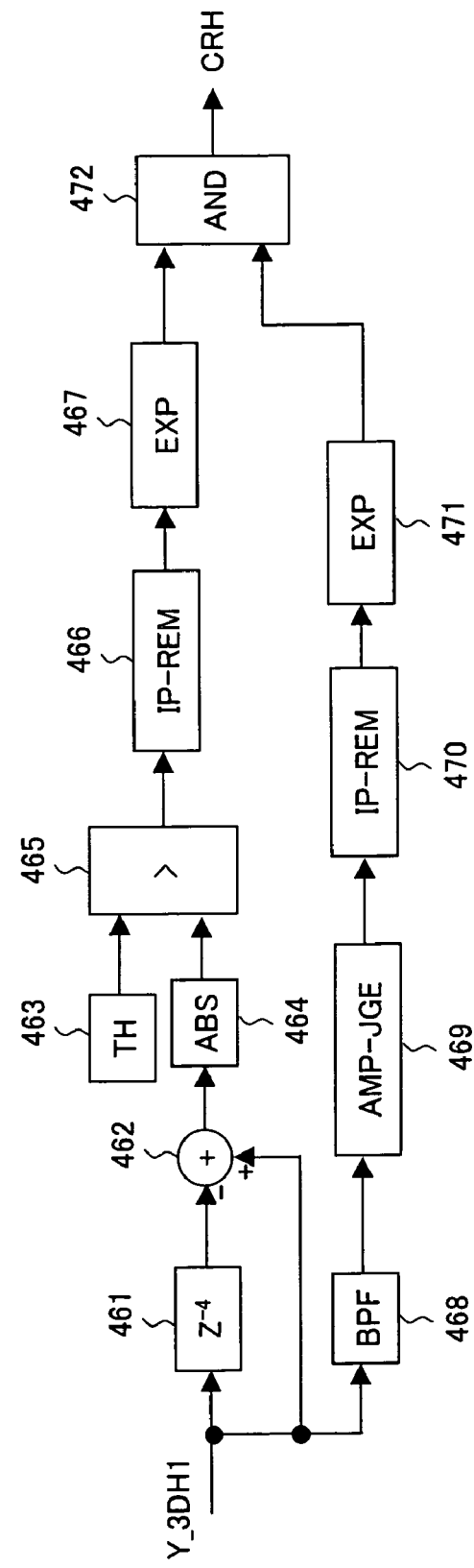
FIG. 6 is a view of the configuration of the configuration of a chroma horizontal correlation detection unit.

FIG. 6 is a view of the configuration of the chroma horizontal correlation detection unit 444-1. As illustrated, the chroma horizontal correlation detection unit 444-1 has a delay circuit 461, a subtractor circuit 462, a threshold value generation circuit 463, an absolute value circuit 464, a comparison circuit 465, an isolated dot elimination circuit 466, an expansion circuit 467, a band pass filter 468, an amplitude judgment circuit 469, an isolated dot elimination circuit 470, an expansion circuit 471, and an AND gate 472.

Below, an explanation will be given of the components of the chroma horizontal correlation detection unit 444-1. The delay circuit 461 delays the Y signal Y_3DH1 by a delay time of one period's worth of the sub-carrier $f_{sc}$ and outputs the delayed signal to the subtractor circuit 462. The subtractor circuit 462 finds the difference between the Y signal Y_3DH1 and the signal delayed by the delay circuit 461 and outputs the same to the absolute value circuit 464.

The absolute value circuit 464 finds the absolute value of the output signals of the subtractor circuit 462 and outputs the same to the comparison circuit 465. The comparison circuit 465 compares the absolute value of the difference between the Y signal calculated by the absolute value circuit 464 and the delay signal thereof and the threshold value output by the threshold value generation circuit 463 and outputs the comparison result to the isolated dot elimination circuit 466.

The isolated dot elimination circuit 466 eliminates an isolated signal from the output signals of the comparison circuit 465 and outputs only continuous signals. The expansion circuit 467 expands the output signal of the isolated dot elimination circuit 466 and outputs the result to the AND gate 472.

The band pass filter 468 is set with a center frequency of the frequency $f_{sc}$ of the sub-carrier. Namely, the band pass filter 468 passes and outputs only the color signal component included in the Y signal Y_3DH1. The amplitude judgment circuit 469 judges the amplitude of the color signal component output from the band pass filter 468 and outputs the amplitude judgment signal having the predetermined level in the section where the amplitude of the color signal component exceeds the predetermined reference value.

The isolated dot elimination circuit 470 eliminates the isolated signal in the amplitude judgment signal output from the amplitude judgment circuit 469 and outputs the result to the expansion circuit 471. The expansion circuit 471 expands the output signal of the isolated dot elimination circuit 470 and outputs the result to the AND gate 472.

The AND gate 472 outputs the judgment signal indicating that there is a chroma horizontal correlation when either of the output signals of the expansion circuits 467 and 471 indicates that there is correlation. On the other hand, when both of the output signals of the expansion circuits 467 and 471 indicate no correlation, a judgment signal indicating that there is no chroma horizontal correlation is output.

Below, an explanation will be given of the operation of the chroma horizontal correlation detection unit 444-1. Horizontal correlation of chroma is detected when the chroma component (Y signal component) remains in the Y signals Y_3DH0, Y_3DH1, and Y_3DH2 found by the frame comb filters 441, 442, and 443 shown in FIG. 4 by utilizing the correlation of the remaining chroma components.

Figure 7:
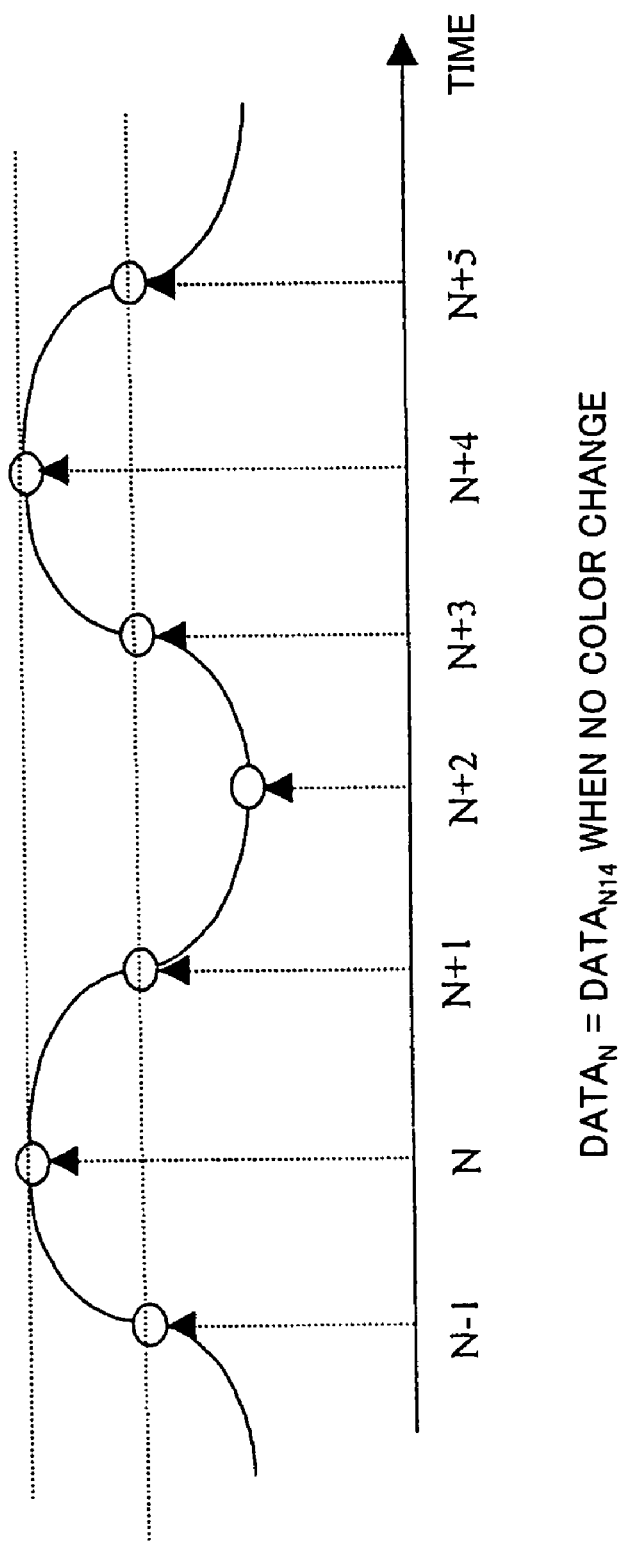
FIG. 7 is a waveform diagram of an example of a color signal sampled by $4f_{sc}$.

In the composite video signal, use is made of the signal obtained by quantification with the sampling rate of $4f_{sc}$ four times the sub-carrier. For this reason, in the case of the same color in the horizontal direction, the color sub-carrier wave becomes as shown in FIG. 7. As shown in FIG. 7, there are sample data of almost the same value at positions separated by exactly one period of the sub-carrier in the horizontal direction in this case, that is, at sample points separated by four.

The chroma horizontal correlation detection unit 444-1 is provided with a delay circuit 461 having a delay amount corresponding to one period's worth of the sub-carrier by utilizing this property. The difference between the delay signal from the delay circuit and the original Y signal Y_3DH1 is calculated by the subtractor circuit 462. By comparing the absolute value of the amplitude of the subtracted signal with a predetermined threshold value, when the absolute value of the amplitude of the subtracted signal is more than the threshold value, there is no horizontal correlation of chroma, conversely when the absolute value of the amplitude of the subtracted signal is less than the threshold value, it is judged that there is horizontal correlation of chroma.

The isolated dot elimination circuit 466 suppresses the influence of noise by eliminating the isolated signal from the output of the comparison circuit 465. The expansion circuit 467 expands the signal compressed by the isolated dot elimination back to the original signal.

Figure 8:
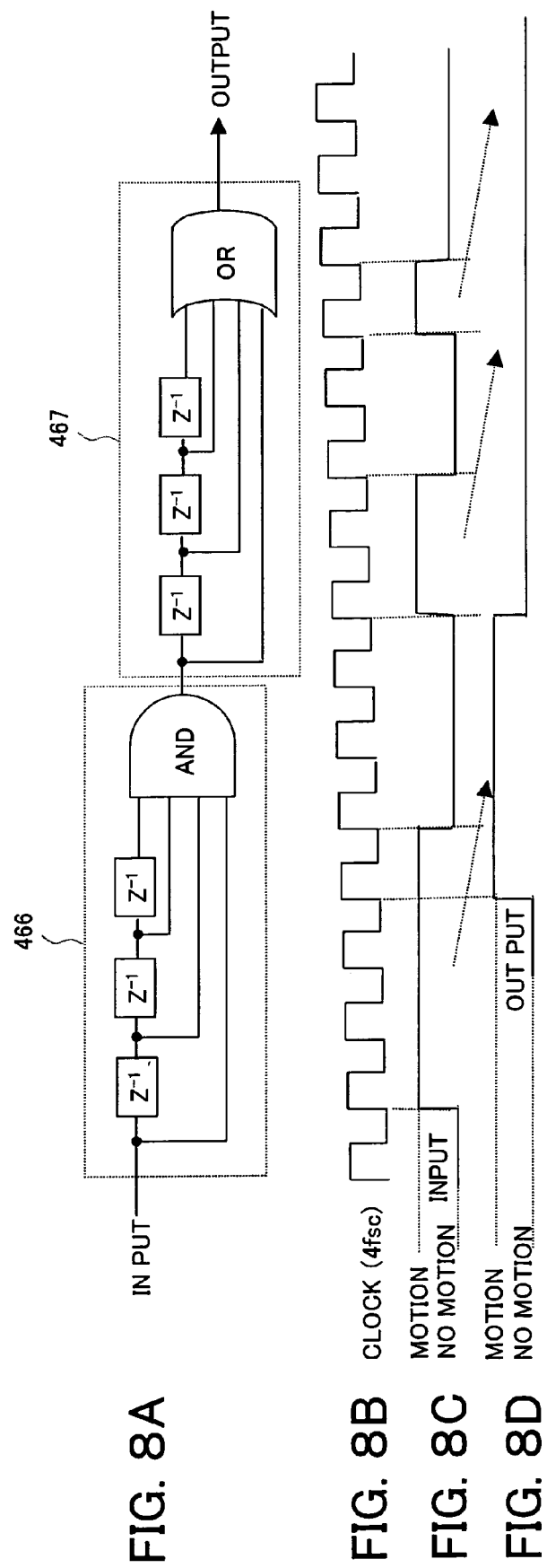
FIG. 8, consisting of FIGS. 8A, 8B, 8C, and 8D, is a view of the configuration and operation of an isolated dot elimination circuit and an expansion circuit.

FIG. 8 shows an example of the configuration of the isolated dot elimination circuit 466 and the expansion circuit 467. FIG. 8(a) is a circuit diagram of the configurations of the isolated dot elimination circuit 466 and the expansion circuit 467; and FIGS. 8(b) to 8(d) are waveform diagrams showing the operations thereof.

As shown in FIG. 8(a), the isolated dot elimination circuit 466 is configured by three serially connected delay circuits and an AND gate, while the expansion circuit is configured by three serially connected delay circuits and an OR gate.

The delay time of the delay circuit configuring the isolated dot elimination circuit 466 and the expansion circuit 467 is ¼ of the period of the sub-carrier. Namely, it is one period of the clock signal CK having a frequency four times the sub-carrier $f_{sc}$.

FIG. 8(b) shows the waveform of the clock signal CK of the frequency $4f_{sc}$. FIG. 8(c) is a waveform diagram of the operation of the isolated dot elimination circuit 466, while FIG. 8(d) is a waveform diagram of the operation of the expansion circuit 467.

As shown in FIG. 8(c), when the input signal is held in an active state continuously for four periods of the clock signal CK, for example, at a high level, a signal of a high level is output from the AND gate of the isolated dot elimination circuit 466. When the high level section of the input signal is not more than four periods of the clock signal CK, the output of the AND gate is held at a low level. Due to this, an isolated signal generated due to, for example, noise is ignored.

The expansion circuit 467 outputs a logical OR of the output signal of the isolated dot elimination circuit 466 and the output signal of the three serially connected delay circuits. As shown in FIG. 8(d), the isolated dot elimination circuit 466 outputs a signal continued for four periods or more of the clock signal CK by the AND gate. Therefore, in accordance with the output signal, an expanded signal held at the high level continuously for four periods of the clock signal CK is output from the OR gate of the expansion circuit 467.

As explained above, the isolated dot elimination circuit 466 and the expansion circuit 467 eliminate a waveform having a short continuous period included in the judgment result. Note that, in the chroma horizontal correlation detection unit 444-1 shown in FIG. 6, the isolated dot elimination circuit 470 and the expansion circuit 471 for eliminating isolated dots and expanding the judgment result of the amplitude judgment circuit 469 have the same configurations as those of the isolated dot elimination circuit 466 and the expansion circuit 467.

As explained above, the chroma horizontal correlation detection unit 444-1 judges whether or not a color signal component remains in the luminance signal Y_3DH1 output by the frame comb filter and outputs the chroma horizontal correlation detection signal CRH in accordance with the judgment result.

Figure 9:
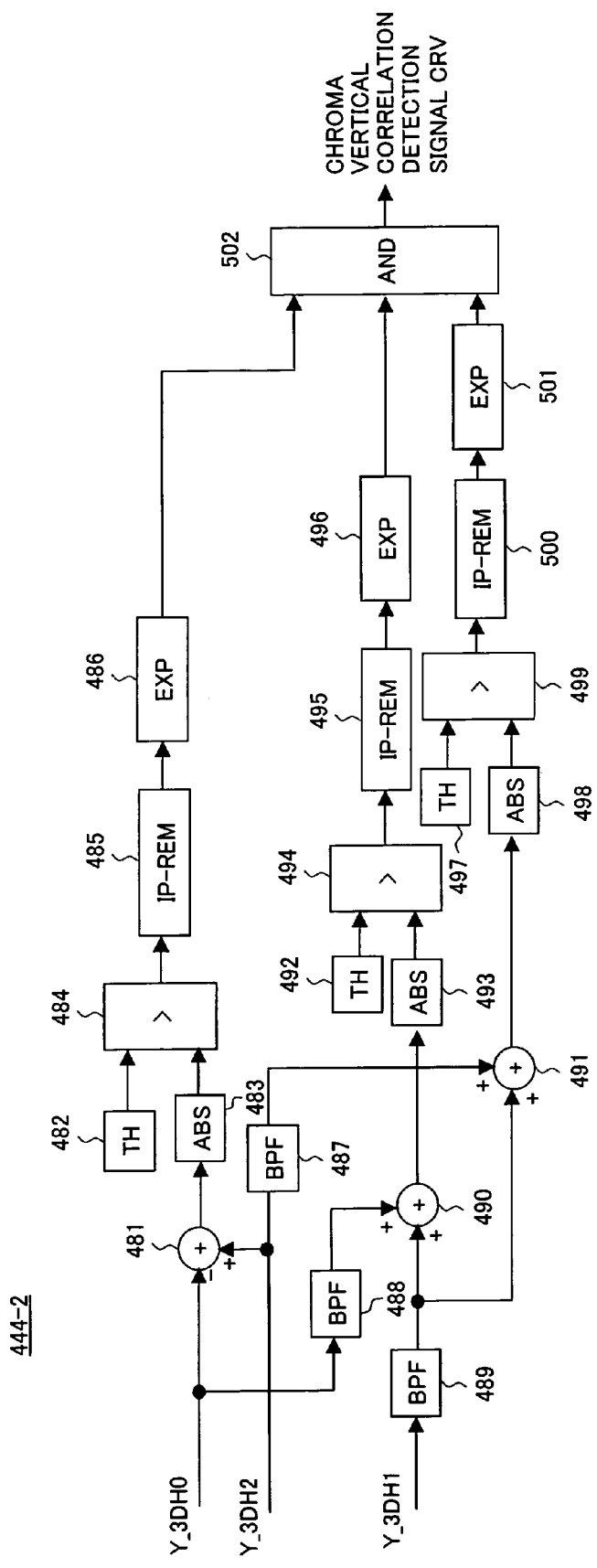
FIG. 9 is a view of the configuration of the configuration of a chroma vertical correlation detection unit.

Next, an explanation will be given of the chroma vertical correlation detection unit 444-2 by referring to FIG. 9. FIG. 9 is a circuit diagram of the configuration of the chroma vertical correlation detection unit 444-2 as one component of the chroma correlation detection circuit 444. The chroma vertical correlation detection unit 444-2 detects the chroma correlation in the vertical direction in accordance with the Y signals Y_3DH0, Y_3DH1, and Y_3DH2 generated by the frame comb filters 441, 442, and 443.

As shown in FIG. 9, the chroma vertical correlation detection unit 444-2 has a subtractor circuit 481, a threshold value generation circuit 482, an absolute value circuit 483, a comparison circuit 484, an isolated dot elimination circuit 485, an expansion circuit 486, band pass filters 487, 488, and 489, adder circuits 490 and 491, a threshold value generation circuit 492, an absolute value circuit 493, a comparison circuit 494, an isolated dot elimination circuit 495, an expansion circuit 496, a threshold value generation circuit 497, an absolute value circuit 498, a comparison circuit 499, an isolated dot elimination circuit 500, an expansion circuit 501, and an AND gate 502.

The subtractor circuit 481 subtracts the Y signals Y_3DH0 and Y_3DH2 generated by the frame comb filters 441, 442, and 443 and outputs the subtraction result to the absolute value circuit 483. The absolute value circuit 483 finds the absolute value of the subtraction results of the subtractor circuit 481 and outputs the same to the comparison circuit 484.

The comparison circuit 484 compares the absolute value of the difference between the Y signal Y_3DH0 and Y_3DH2 input from the absolute value circuit 483 and the predetermined threshold value output by the threshold value generation circuit 482 and outputs a judgment signal in accordance with the result of the comparison to the isolated dot elimination circuit 485.

The isolated dot elimination circuit 485 eliminates any discontinuous isolated signal included in the judgment result output from the comparison circuit 484. The expansion circuit 486 expands the output signal of the isolated dot elimination circuit 485 and outputs the result to the AND gate 502.

The band pass filters 487, 488, and 489 use the frequency $f_{sc}$ of the sub-carrier as the center frequency. The band pass filter 487 passes the color signal component included in the Y signal Y_3DH2 and outputs it to the adder circuit 491. The band pass filter 488 passes the color signal component included in the Y signal Y_3DH0 and outputs it to the adder circuit 490. The band pass filter 489 passes the color signal component included in the Y signal. Y_3DH1 and outputs it to the adder circuits 490 and 491.

The adder circuit 490 adds the output signals of the band pass filters 488 and 489 and outputs the addition result to the absolute value circuit 493. Namely, the output signal of the adder circuit 490 includes the sum of the color signal components included in the Y signals Y_3DH0 and Y_3DH1. The adder circuit 491 adds the output signals of the band pass filters 487 and 489 and outputs the addition result to the absolute value circuit 498. Namely, the output signal of the adder circuit 491 includes the sum of the color signal components included in the Y signals Y_3DH2 and Y_3DH1.

The absolute value circuit 493 finds the absolute value of the output signals of the adder circuit 490 and outputs it to the comparison circuit 494. The comparison circuit 494 compares the absolute value of the sum of the color signal components included in the Y signals Y_3DH0 and Y_3DH1 output from the absolute circuit 493 and the threshold value output from the threshold value generation circuit 492 and outputs a comparison signal in accordance with the comparison result.

The isolated dot elimination circuit 495 eliminates any discontinuous isolated signal included in the judgment result output from the comparison circuit 494. The expansion circuit 496 expands the output signal of the isolated dot elimination circuit 495 and outputs the result to the AND gate 502.

The absolute value circuit 498 finds the absolute value of the output signal of the adder circuit 491 and outputs it to the comparison circuit 499. The comparison circuit 499 compares the absolute value of the sum of the color signal components included in the Y signals Y_3DH2 and Y_3DH1 output from the absolute circuit 498 and the threshold value output from the threshold value generation circuit 497 and outputs a comparison signal in accordance with the comparison result.

The isolated dot elimination circuit 500 eliminates any discontinuous isolated signal included in the judgment result output from the comparison circuit 499. The expansion circuit 501 expands the output signal of the isolated dot elimination circuit 500 and outputs the result to the AND gate 502.

The AND gate 502 finds the logical AND of the judgment result signals output from the expansion circuits 486, 496, and 501 and outputs the result as the chroma vertical correlation judgment result.

Next, an explanation will be given of the operation of the chroma vertical correlation detection unit 444-2 having the above configuration. The Y signals Y_3DH0, Y_3DH1, and Y_3DH2 input to the chroma vertical correlation detection unit 444-2 are generated by the frame comb filters 441, 442, and 443 in the C motion detection unit 440 shown in FIG. 4.

When there is motion in the image, the color signal component sometimes leaks into the Y signals Y_3DH0, Y_3DH1, and Y_3DH2 generated by the frame comb filters 441, 442, and 443. The chroma vertical correlation detection unit 444-2 detects the color signal component leaked into these Y signals and judges motion in accordance with the result of the detection.

Concretely, when the Y signals Y_3DH0, Y_3DH1, and Y_3DH2 are the Y signals obtained from the composite video signals of three adjacent lines, if color signal components are included in these Y signals, the phases of the color signal components of the Y signals Y_3DH0 and Y_3DH2 coincide, and the phases of the color signal components of the Y signals Y_3DH0 and Y_3DH1, and the Y signals Y_3DH1 and Y_3DH2 are shifted by 180° from each other. Note that, in the case of the PAL system of composite video signals, the same relationship stands for signals of every other line. Namely, when the PAL system of composite video signals are processed, the Y signals Y_3DH0, Y_3DH1, and Y_3DH2 are utilized as the luminane signals obtained from the video signals of every other line.

By utilizing this property of a color signal component mixed into the Y signal, the chroma vertical correlation detection unit 444-2 calculates the difference between the Y signals Y_3DH0 and Y_3DH2 in which the color signal components have the same phase and judges motion in accordance with the result of comparison of the absolute value of the difference and the predetermined threshold value. When there is motion, a difference arises between the phase of the color signal components leaked into the Y signals Y_3DH0 and Y_3DH2 and the amplitude; therefore it can be expected that the absolute value of the difference of these Y signals will become more than a certain reference value in accordance with the amount of the motion. For this reason, when the result of the comparison between the absolute value of the difference of the Y signals Y_3DH0 and Y_3DH2 and the predetermined threshold value is that the absolute value of the difference is larger than the threshold value, it is decided that there is motion, and a motion detection signal in the active state, for example, at a high level (first motion detection signal) is output. The result obtained by eliminating noise from the motion detection signal by the isolated dot elimination and the expansion is output to the AND gate 502.

Next, when the color signal components have inverse phases, that is, for the Y signals Y_3DH0 and Y_3DH1 and Y signals Y_3DH1 and Y_3DH2 in which phases of subcarriers are shifted by 180°, the chroma vertical correlation detection unit 444-2 passes these Y signals through the band pass filter using the frequency $f_{sc}$ of the sub-carrier as the center frequency and extracts the color signal components. Then, it detects correlation based on the color signal component extracted from each Y signal.

Concretely, the sum signal of the color signal components of the Y signals Y_3DH0 and Y_3DH1 extracted by the band pass filter is calculated. In accordance with the comparison result between the absolute value of the sum signal and the predetermined threshold value, the second vertical motion detection signal is output.

Further, the sum signal of the color signal components of the Y signals Y_3DH1 and Y_3DH2 extracted by the band pass filter is calculated. The third vertical motion detection signal is output in accordance with the comparison result of the absolute value of the sum signal and the predetermined threshold value. Then, noise is eliminated from the first, second, and third vertical motion detection signals mentioned above by the isolated dot elimination and expansion. The results are output to the AND gate 502.

By the AND gate 502, the chroma vertical correlation detection signal CRV is output in accordance with the logical AND of three motion detection signals obtained by the above processing. Namely, only when the motion is detected by all of the processing, the chroma vertical correlation detection signal CRV indicating that there is motion is output.

The C motion detection circuit 440 shown in FIG. 4 calculates Y signals Y_3DH0, Y_3DH1, and Y_3DH2 in three adjacent lines from the composite video signals of three lines of the current frame and the past frame by the frame comb filters 441, 442, and 443 as mentioned above and outputs the same to the chroma correlation detection circuit 444.

The chroma correlation detection circuit 444 is provided with the chroma horizontal correlation detection circuit 444-1 shown in FIG. 6 and the chroma vertical correlation detection circuit 444-2 shown in FIG. 9. These correlation detection circuits detect the correlation of the color signal components included in the Y signals in each of the horizontal direction and vertical direction of the image and judge whether or not there is motion in accordance with the result of the detection.

Next, an explanation will be given of the overall operation of the video signal processor of the present embodiment while referring to FIG. 1. The video signal processor of the present embodiment is supplied with three adjacent lines' worth of the composite video signals CVHc0, CVHc1, and CVHc2 of the current frame and three adjacent lines' worth of the composite video signals CVHp0, CVHp1, and CVHp2 of one past frame.

The comb filter 10 carries out the Y/C separation in accordance with the three adjacent lines' worth of the composite video signals CVHc0, CVHc1, and CVHc2 of the current frame to find the Y signal $Y_{cur}$ and the color signal $C_{cur}$ corresponding to these three lines' worth of the composite video signals in the current frame. The comb filter 20 carries out the Y/C separation in accordance with three adjacent lines' worth of the composite video signals CVHp0, CVHp1, and CVHp2 in the past frame to find the Y signal $Y_{pst}$ and the color signal $C_{pst}$ corresponding to these three lines' worth of the composite video signals in the past frame.

The Y motion detection circuit 30 finds the difference of these Y signals in accordance with the Y signal $Y_{cur}$ separated from the composite video signals of the current frame and the Y signal $Y_{pst}$ separated from the composite video signals of the past frame and generates the Y motion coefficient $MVC_y$ in accordance with the difference of the Y signals.

The C motion detection circuit 40A calculates the difference of these C signals in accordance with the C signal $C_{cur}$ separated from the composite video signals of the current frame and the C signal $C_{pst}$ separated from the composite video signals of the past frame. The provisional 3D Y/C separation motion detection circuit 401 calculates the Y signal corresponding to the video signals of three adjacent lines in the current frame and the Y signals corresponding to the video signals of three adjacent lines in the past frame based on the composite video signals of the current frame and the composite video signals of the past frame by using the frame comb filters.

The Y motion detection circuit calculates the difference between the Y signals of the current frame and the Y signals of the past frame and judges motion in accordance with the difference value. The C motion detection circuit detects the chroma horizontal correlation and detects the chroma vertical correlation based on the Y signals corresponding to the video signals of three adjacent lines in the current frame found by the frame comb filters. Then, when detecting the correlation of chroma in both of the horizontal and vertical directions, it decides that the chroma component leaked into the Y signal by the motion of the image and outputs the motion detection signal indicating the motion detection.

When either of the Y motion detection circuit or the C motion detection circuit detects motion, it is judged that there is motion. Then, the C motion detection circuit 40A generates a C motion coefficient in accordance with this judgment result. For example, when the provisional 3D Y/C separation motion detection circuit 401 detects motion in the image, it selects the difference between the C signal $C_{cur}$ separated from the composite video signals of the current frame and the C signal $C_{pst}$ separated from the composite video signals of the past frame and generates the C motion coefficient $MVC_c$ in accordance with the difference. On the other hand, where not detecting motion in the image, it outputs a predetermined value, for example, 0, as the motion coefficient.

The video signal processor of the present embodiment outputs the largest value among the Y motion coefficient $MVC_y$ and the C motion coefficient $MVC_c$ output by the Y motion detection circuit 30 and the C motion detection circuit 40A as the motion coefficient MVC. Then, it decides whether or not there is motion in the image based on the motion coefficient and can suitably carry out Y/C separation based on the decision result.

As explained above, according to the present embodiment, the provisional 3D Y/C separation motion detection circuit is provided in the C motion detection circuit. The Y signals in the current frame and the past frame are found based on the composite video signals of three adjacent lines of the current frame and the composite video signals of three adjacent lines of the past frame by this. In accordance with these Y signals, Y motion is detected in accordance with the difference between the Y signals of the current frame and the Y signals of the past frame by the Y motion detection unit, the Y motion detection signal $MVD_y$ is output, the C motion is detected based on the Y signals of three adjacent lines in the current frame by the C motion detection unit, and the C motion detection signal $MVD_c$ is output. Then, when either of the motion detection signals $MVD_y$ and $MVD_c$ indicates motion in the provisional 3D Y/C separation motion detection circuit, the motion detection signal MVD indicating that there is motion is output. In the C motion detection circuit 40A, the difference of the C signals separated from the current frame and the past frame or the predetermined value 0 is selected in accordance with the motion detection signal MVD, the C motion coefficient is generated, and the largest value among the Y motion coefficients found by the Y motion detection circuit 30 is output as the motion coefficient MVC. Therefore the motion of the image can be judged based on the motion coefficient MVC. The Y/C separation can be appropriately carried out based on the judgment result, so the precision of the motion detection can be improved, and erroneous detection can be prevented.

Second Embodiment

Figure 10:
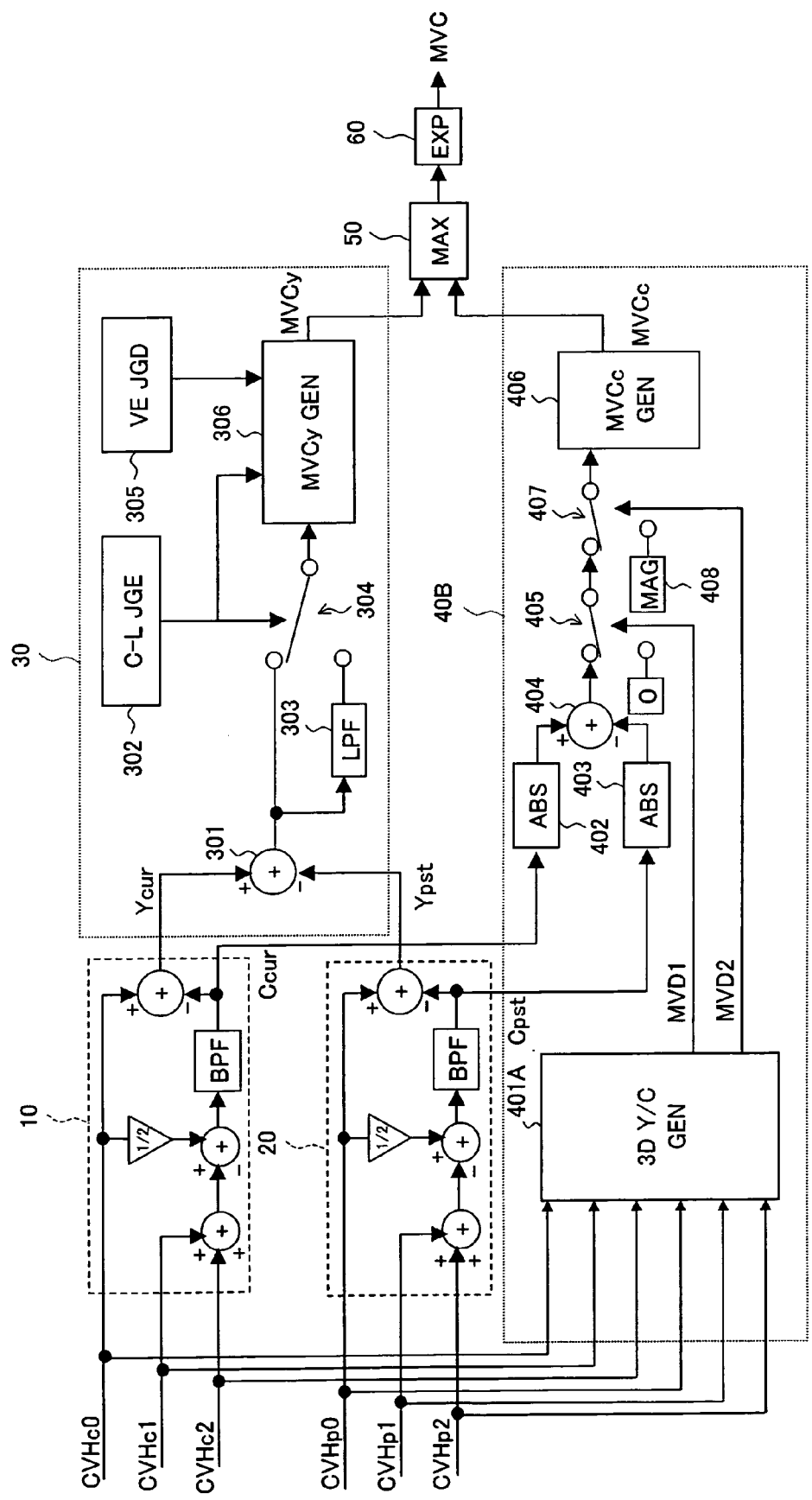
FIG. 10 is a view of the configuration of a video signal processor according to a second embodiment of the present invention.

FIG. 10 is a view of the configuration of a video signal processor according to a second embodiment of the present invention. As illustrated, the video signal processor of the present embodiment has comb filters 10 and 20, a Y motion detection circuit 30, a C motion detection circuit 40B, a maximum value circuit (MAX) 50, and an expansion circuit 60.

In comparison with the first embodiment of the present invention shown in FIG. 1, in the video signal processor of the present embodiment, the configuration of the C motion detection circuit 40B is different from that of the C motion detection circuit 40A of the first embodiment. The components other than this are substantially the same as the corresponding portions of the first embodiment. For this reason, the following explanation will be given focusing on the C motion detection circuit 40B.

As shown in FIG. 10, in the video signal processor of the present embodiment, the C motion detection circuit 40B has a provisional 3D Y/C separation motion detection circuit 401A, absolute value circuits 402 and 403, a subtractor circuit 404, selection circuits 405 and 407, a maximum coefficient generation circuit (MAG) 408, and a C motion coefficient generation circuit 406.

As illustrated, in the present embodiment, in the C motion detection circuit 40B, the selection circuit 407 and the maximum coefficient generation circuit 408 are added. The selection circuit 407 selects either of the output of the selection circuit 405 or the intended motion coefficient generated by the maximum coefficient generation circuit 408 according to the motion detection signal MVD2 output from the provisional 3D Y/C separation motion detection circuit 401A and outputs the same to the motion coefficient generation circuit 406.

Figure 11:
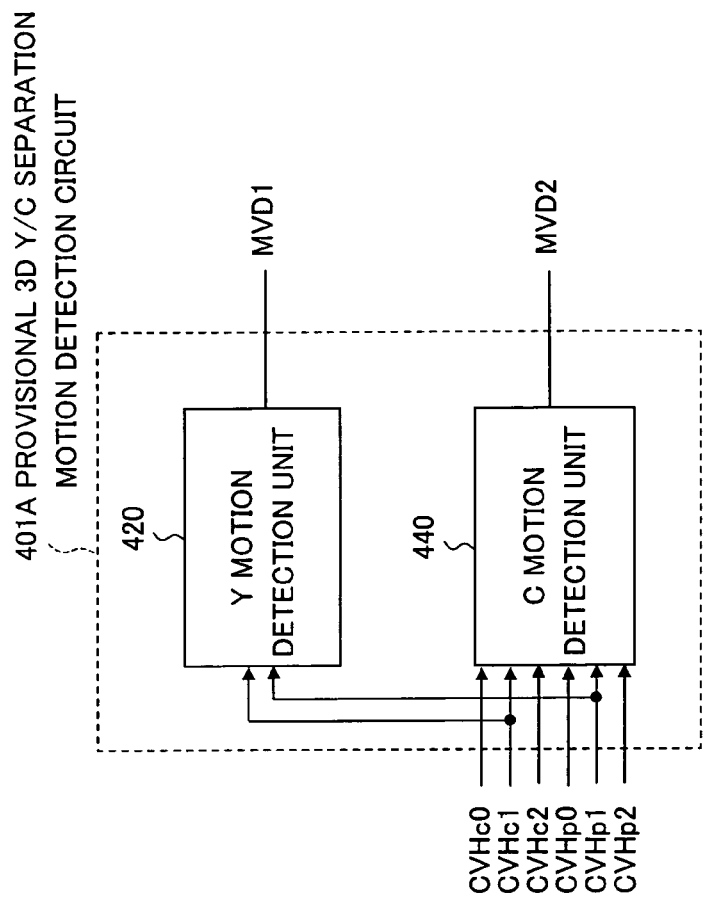
FIG. 11 is a block diagram of the configuration of a provisional 3D Y/C separation motion detection circuit in the second embodiment.
Figure 12:
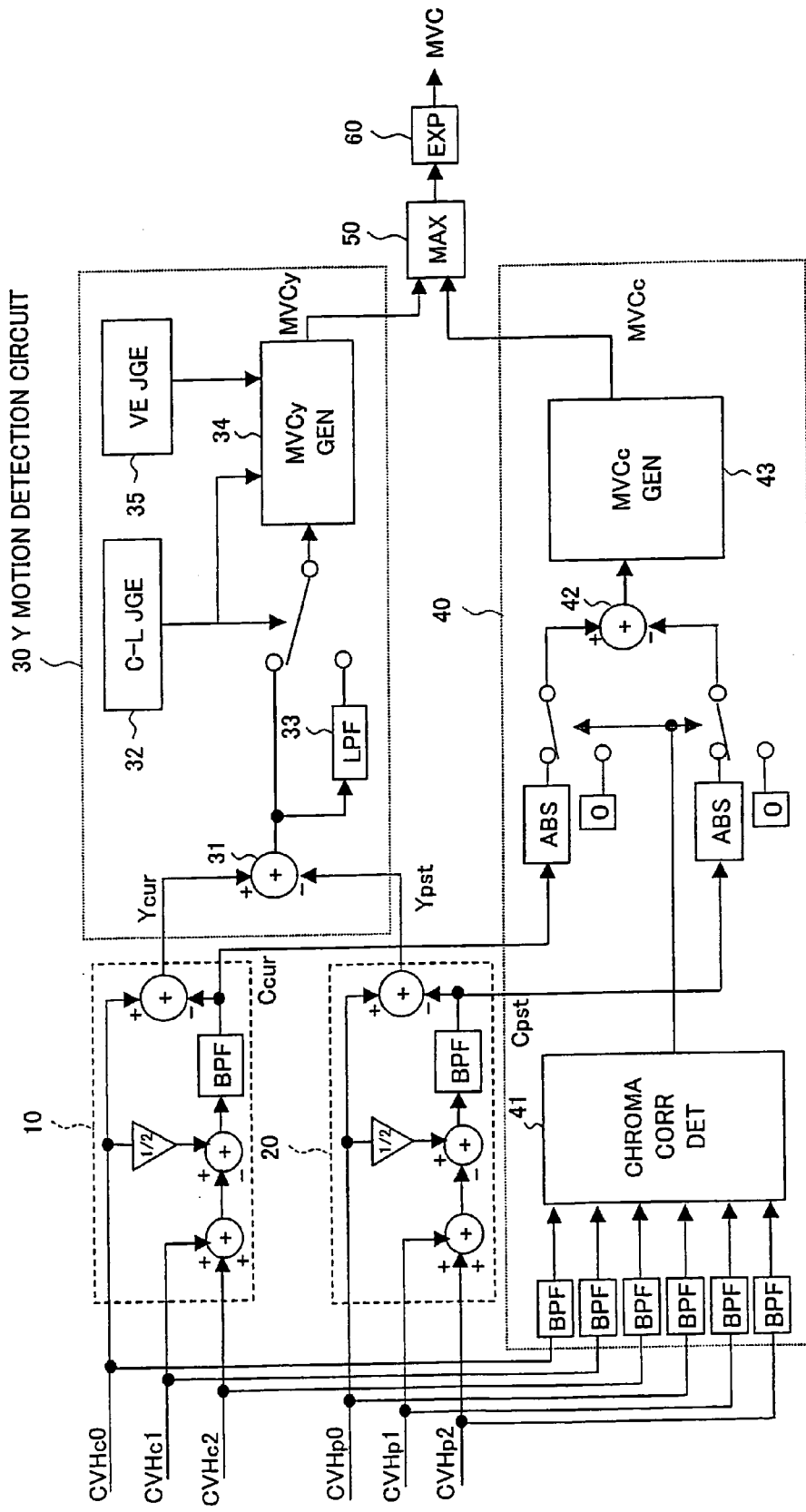
FIG. 12 is a block diagram of an example of the configuration of a conventional video signal processor.

Below, an explanation will be given of the configuration of the parts of the C motion detection circuit 40B of the present embodiment. FIG. 11 is a view of the configuration of the provisional 3D Y/C separation motion detection circuit 401A used in the C motion detection circuit 40B of the present embodiment. As shown in FIG. 11, in the present embodiment, the provisional 3D Y/C separation motion detection circuit 401A has a Y motion detection unit 420 and a C motion detection unit 440.

The Y motion detection unit 420 outputs a motion detection signal MVD1, while the C motion detection unit 440 outputs a motion detection signal MVD2. Namely, the motion detection signal MVD1 is the Y motion detection signal, and the motion detection signal MVD2 is the C motion detection signal.

As shown in FIG. 10, in the C motion detection circuit 40B, the absolute value circuits 402 and 403 output the C signal $C_{cur}$ of the current frame and the C signal $C_{pst}$ of the past frame. The subtractor circuit 404 outputs the difference of the absolute values of these C signals.

The selection circuit 405 selects the result of the subtractor circuit 404 or the intended value, for example 0, in accordance with the motion detection signal MVD1 output from the provisional 3D Y/C separation motion detection circuit 401A. When the motion detection signal MVD1 indicates that there is motion, the selection circuit 405 selects the output of the subtractor circuit 404. Conversely, when the motion detection signal MVD1 indicates no motion, the selection circuit 405 selects the 0 data.

The selection circuit 407 selects either of the output data of the selection circuit 405 or the maximum coefficient output by the maximum coefficient generation circuit 408 in accordance with the motion detection signal MVD2 output from the provisional 3D Y/C separation motion detection circuit 401A.

The maximum coefficient generation circuit 408 generates the maximum value of the motion coefficients. Here, for example, when the motion coefficient is represented by a positive integer of 4 bits, the maximum value of the motion coefficients becomes 15 (0xff of hexadecimal notation), and the maximum coefficient generation circuit 408 outputs this maximum value 15.

When the motion detection signal MVD2 output from the provisional 3D Y/C separation motion detection circuit 401A indicates that there is motion, the selection circuit 407 selects the maximum integer value output by the maximum coefficient generation circuit 408 and outputs the same to the C motion coefficient generation circuit 406. On the other hand, when the motion detection signal MVD2 output from the provisional 3D Y/C separation motion detection circuit 401A indicates no motion, the selection circuit 406 selects the output data of the selection circuit 405 and outputs the same to the C motion coefficient generation circuit 406.

Namely, the C motion detection circuit 40B of the present embodiment generates the motion coefficient in accordance with two motion detection signals MVD1 and MVD2 output by the provisional 3D Y/C separation motion detection circuit 401A. First, when the motion detection signal MVD1, that is, the Y motion detection signal output by the Y motion detection unit 420 configuring the provisional 3D Y/C separation motion detection circuit 401A indicates that there is motion, the selection circuit 405 selects the difference data of the absolute values of the C signals of the current frame and the past frame. Conversely, when the motion detection signal MVD1 indicates no motion, it selects the data 0. Next, when the motion detection signal MVD2, that is, the C motion detection signal output by the C motion detection unit 440 configuring the provisional 3D Y/C separation motion detection circuit 401A, indicates that there is motion, the selection circuit 407 selects the maximum value of the motion coefficients. Conversely, when the motion detection signal MVD2 indicates no motion, the output of the selection circuit 405 is selected.

Namely, the selection circuits 405 and 407 perform selection two times. When the motion detection signal MVD2 output from the provisional 3D Y/C separation motion detection circuit 401B indicates that there is motion, the selection circuit 405 selects the difference of the C signal absolute. When the motion detection signal MVD2 output from the provisional 3D Y/C separation motion detection circuit 401B indicates that there is motion, it selects the maximum value of the motion coefficients and supplies it to the C motion coefficient generation circuit 406. Therefore, the C motion coefficient generation circuit 406 can generate a motion coefficient $MVC_c$ indicating motion.

As explained above, according to the present embodiment, the C motion detection circuit 40B selects the motion coefficient by two cascade connected selection circuits in accordance with the motion detection signals MVD1 and MVD2 output from the provisional 3D Y/C separation motion detection circuit 401A. When the motion detection signal MVD2, that is, the C motion detection signal output by the C motion detection unit in the provisional 3D Y/C separation motion detection circuit 401A, indicates that there is motion, the latter stage selection circuit 407 selects the maximum value of the motion coefficients and supplies it to the C motion coefficient generation circuit 406. Therefore, erroneous detection of motion or failure of detection can be prevented, and the precision of the motion detection can be improved.

Summarizing the effects of the invention, as explained above, according to the video signal processor and the TV receiver of the present invention, there are the advantages that the precision of the motion detection can be improved based on the composite video signals, erroneous detection of motion due to a specific pattern such as an oblique line in a still image can be avoided, and deterioration of the image quality due to the erroneous detection of motion can be prevented.

Further, the present invention performs Y/C separation based on the composite video signals by using the provisional 3D Y/C separation motion detection circuit, detects the correlation between the color signal components in the horizontal and vertical directions based on the luminance signal and the color signal obtained by this and based on the correlation of the color signal components remaining in the luminance signal when there is motion, and judges motion based on the detection result, therefore it is possible to prevent erroneous judgment or failure of judgment and improve the precision of the motion judgment.

While the invention has been described with reference to specific embodiments chosen for purpose of illustration, it should be apparent that numerous modifications could be made thereto by those skilled in the art without departing from the basic concept and scope of the invention.

What is claimed is:

1. A video signal processor comprising:
   a first motion detection unit for finding a difference between a luminance signal included in a predetermined composite video signal in a current frame and a luminance signal included in a composite video signal in a past frame having a predetermined time interval and outputting a first motion detection signal in accordance with the difference;
   a second motion detection unit for extracting luminance signals included in a plurality of composite video signals in said current frame based on a plurality of composite video signals having a predetermined interval in a vertical direction in said current frame and a plurality of predetermined composite video signals in the vertical direction at the same position in said past frame, detecting the correlation of color signal components remaining in the extracted video signals, and outputting a second motion detection signal in accordance with the result of the detection;
   a color signal difference calculating means for calculating a difference of absolute values of color signals in the current frame calculated based on said three composite video signals in said current frame and color signals in the past frame calculated based on the composite video signals of said past frame;
   a selecting means for selecting the difference of said color signals calculated by said color signal difference calculating means when either of said first motion detection signal or said second motion detection signal indicates that there is motion and selecting an intended value indicating that there is no motion when both of said first motion detection signal and said second motion detection signal indicate that there is no motion; and a motion coefficient generating means for outputting a motion coefficient indicating motion in accordance with the value selected by said selecting means.

2. A video signal processor as set forth in claim 1, wherein said second motion detection unit comprises:

a first horizontal correlation detection unit for outputting a first horizontal correlation detection signal in accordance with a difference between said extracted luminance signal and a delay signal obtained by delaying the luminance signal by exactly one period's worth of said color sub-carrier wave, a second horizontal correlation detection unit for outputting a second horizontal correlation detection signal in accordance with an amplitude of the signal obtained by passing said extracted luminance signal through a band pass filter using the frequency of said color sub-carrier wave as the center frequency, and a logical circuit for generating a horizontal correlation detection signal indicating the horizontal correlation of color signals in accordance with a logical AND of said first and second horizontal correlation detection signals.

3. A video signal processor as set forth in claim 2, wherein said second motion detection unit comprises:

a first vertical correlation detection unit for outputting a first vertical correlation detection signal in accordance with a difference between first and third luminance signals extracted from the composite video signals in which corresponding color signals have the same phase in accordance with first, second, and third luminance signals extracted from three composite video signals in the vertical direction in said current frame, a second vertical correlation detection unit for outputting a second vertical correlation detection signal in accordance with a difference between signals obtained from the first and the second luminance signals corresponding to the composite video signals in which corresponding color signals have inverse phases passed through the band pass filter using the frequency of the color sub-carrier wave as the center frequency, a third vertical correlation detection unit for outputting a third vertical correlation detection signal in accordance with a difference of signals obtained from the second and third luminance signals corresponding to the composite video signals in which corresponding color signals have inverse phases passed through the band pass filter using the frequency of the color sub-carrier wave as the center frequency, a logical circuit for generating a vertical correlation detection signal indicating vertical correlation of the color signals in accordance with the logical AND of said first, second, and third vertical correlation detection signals, and a logical operation circuit for outputting said second motion detection signal in accordance with the logical AND of said horizontal correlation detection signal and said vertical correlation detection signal.

4. A video signal processor comprising:

a first motion detection unit for finding a difference between a luminance signal included in a predetermined composite video signal in a current frame and a luminance signal included in a composite video signal in a past frame having a predetermined time interval and outputting a first motion detection signal in accordance with the difference;

a second motion detection unit for extracting luminance signals included in three composite video signals in said current frame based on three composite video signals having a predetermined interval in a vertical direction in said current frame and three predetermined composite video signals in the vertical direction at the same position in said past frame, detecting the correlation of color signal components remaining in the extracted video signals, and outputting a second motion detection signal in accordance with the result of the detection;

a color signal difference calculating means for calculating a difference of absolute values of color signals in the current frame calculated based on said three composite video signals in said current frame and color signals in the past frame calculated based on the composite video signals of said past frame;

a first selecting means for selecting the difference of said color signals calculated by said color signal difference calculating means when said first motion detection signal indicates that there is motion and selecting an intended first value indicating that there is no motion when said first motion detection signal indicates that there is no motion;

a second selecting means for selecting an intended second value indicating that there is motion when said second motion detection signal indicates that there is motion and selecting the output signal of said first selecting means when said second motion detection signal indicates that there is no motion; and a motion coefficient generating means for outputting the motion coefficient indicating motion in accordance with the value selected by said second selecting means.

5. A video signal processor as set forth in claim 4, wherein said second motion detection unit comprises:

a first horizontal correlation detection unit for outputting a first horizontal correlation detection signal in accordance with a difference between said extracted luminance signal and a delay signal obtained by delaying the luminance signal by exactly one period's worth of said color sub-carrier wave, a second horizontal correlation detection unit for outputting a second horizontal correlation detection signal in accordance with an amplitude of the signal obtained by passing said extracted luminance signal through a band pass filter using the frequency of said color sub-carrier wave as the center frequency, and a logical circuit for generating a horizontal correlation detection signal indicating the horizontal correlation of color signals in accordance with a logical AND of said first and second horizontal correlation detection signals.

6. A video signal processor as set forth in claim 5, wherein said second motion detection unit comprises:

a first vertical correlation detection unit for outputting a first vertical correlation detection signal in accordance with a difference between first and third luminance signals extracted from the composite video signals in which corresponding color signals have the same phase in accordance with first, second, and third luminance signals extracted from three composite video signals in the vertical direction in said current frame, a second vertical correlation detection unit for outputting a second vertical correlation detection signal in accordance with a difference between signals obtained from the first and the second luminance signals corresponding to the composite video signals in which corresponding color signals have inverse phases passed through the band pass filter using the frequency of the color sub-carrier wave as the center frequency, a third vertical correlation detection unit for outputting a third vertical correlation detection signal in accordance with a difference of signals obtained from the second and third luminance signals corresponding to the composite video signals in which corresponding color signals have inverse phases passed through the band pass filter using the frequency of the color sub-carrier wave as the center frequency, a logical circuit for generating a vertical correlation detection signal indicating vertical correlation of the color signals in accordance with the logical AND of said first, second, and third vertical correlation detection signals, and a logical operation circuit for outputting said second motion detection signal in accordance with the logical AND of said horizontal correlation detection signal and said vertical correlation detection signal.

7. A TV receiver for judging motion of an image in accordance with a motion coefficient generated based on a composite video signal, separating a luminance signal and a color signal from said composite video signal by using a frame comb filter for a still image having no motion, separating a luminance signal and a color signal from said composite video signal by using a band pass filter or a two-dimensional comb filter for a moving picture having motion and reproducing a video signal, comprising:

a first motion detection unit for finding a difference between a luminance signal included in a predetermined composite video signal in a current frame and a luminance signal included in a composite video signal in a past frame having a predetermined time interval and outputting a first motion detection signal in accordance with the difference;

a second motion detection unit for extracting luminance signals included in three composite video signals in said current frame based on three composite video signals having a predetermined interval in a vertical direction in said current frame and three predetermined composite video signals in the vertical direction at the same position in said past frame, detecting the correlation of color signal components remaining in the extracted video signals, and outputting a second motion detection signal in accordance with the result of the detection;

a color signal difference calculating means for calculating a difference of absolute values of color signals in the current frame calculated based on said three composite video signals in said current frame and color signals in the past frame calculated based on the composite video signals of said past frame;

a selecting means for selecting the difference of said color signals calculated by said color signal difference calculating means when either of said first motion detection signal or said second motion detection signal indicates that there is motion and selecting an intended value indicating that there is no motion when both of said first motion detection signal and said second motion detection signal indicate that there is no motion; and a motion coefficient generating means for outputting a motion coefficient indicating motion in accordance with the value selected by said selecting means.

8. A TV receiver for judging motion of an image in accordance with a motion coefficient generated based on a composite video signal, separating a luminance signal and a color signal from said composite video signal by using a frame comb filter for a still image having no motion, separating a luminance signal and a color signal from said composite video signal by using a band pass filter or a two-dimension comb filter for a moving picture having motion and reproducing the video signal, comprising:

a first motion detection unit for finding a difference between a luminance signal included in a predetermined composite video signal in a current frame and a luminance signal included in a composite video signal in a past frame having a predetermined time interval and outputting a first motion detection signal in accordance with the difference;

a second motion detection unit for extracting luminance signals included in a plurality of composite video signals in said current frame based on a plurality of composite video signals having a predetermined interval in a vertical direction in said current frame and a plurality of predetermined composite video signals in the vertical direction at the same position in said past frame, detecting the correlation of color signal components remaining in the extracted video signals, and outputting a second motion detection signal in accordance with the result of the detection;

a color signal difference calculating means for calculating a difference of absolute values of color signals in the current frame calculated based on said three composite video signals in said current frame and color signals in the past frame calculated based on the composite video signals of said past frame;

a first selecting means for selecting the difference of said color signals calculated by said color signal difference calculating means when said first motion detection signal indicates that there is motion and selecting an intended first value indicating that there is no motion when said first motion detection signal indicates that there is no motion;

a second selecting means for selecting an intended second value indicating that there is motion when said second motion detection signal indicates that there is motion and selecting the output signal of said first selecting means when said second motion detection signal indicates that there is no motion; and a motion coefficient generating means for outputting a motion coefficient indicating motion in accordance with the value selected by said second selecting means.

* * * * *